US011938939B1

(12) United States Patent
Li et al.

(10) Patent No.: US 11,938,939 B1
(45) Date of Patent: Mar. 26, 2024

(54) DETERMINING CURRENT STATE OF TRAFFIC LIGHT(S) FOR USE IN CONTROLLING AN AUTONOMOUS VEHICLE

(71) Applicant: Aurora Innovation, Inc., Palo Alto, CA (US)

(72) Inventors: Yan Li, San Francisco, CA (US); Davis Edward King, Billerica, MA (US)

(73) Assignee: AURORA OPERATIONS, INC., Mountain View, CA (US)

( * ) Notice: Subject to any disclaimer, the term of this patent is extended or adjusted under 35 U.S.C. 154(b) by 786 days.

(21) Appl. No.: 17/039,517

(22) Filed: Sep. 30, 2020

Related U.S. Application Data

(60) Provisional application No. 63/034,522, filed on Jun. 4, 2020.

(51) Int. Cl.
*G06N 20/00* (2019.01)
*B60W 30/18* (2012.01)
(Continued)

(52) U.S. Cl.
CPC .... *B60W 30/18154* (2013.01); *B60W 60/001* (2020.02); *G06N 20/00* (2019.01);
(Continued)

(58) Field of Classification Search
CPC ......... B60W 30/18154; B60W 60/001; B60W 2554/802; G06N 20/00; G06V 20/56;
(Continued)

(56) References Cited

U.S. PATENT DOCUMENTS 8,559,673 B2   10/2013   Fairfield et al.
9,145,140 B2    9/2015   Ferguson et al.
(Continued)

FOREIGN PATENT DOCUMENTS

WO   WO-2021133837 A1 *  7/2021  ............ G01S 13/44

OTHER PUBLICATIONS

Hirabayashi, Manato, et al. "Traffic light recognition using high-definition map features." Robotics and Autonomous Systems 111 (2019): 62-72.*
Levinson et al., "Traffic light mapping, localization, and state detection for autonomous vehicles," May 9, 2011 IEEE International Conference on Robotics and Automation, Shanghai, 2011, pp. 5784-5791, doi: 10.1109/ICRA.2011.5979714.

*Primary Examiner* — Shefali D Goradia
(74) *Attorney, Agent, or Firm* — Gray Ice Higdon

(57) ABSTRACT

Systems and methods for determining a current state of at least one traffic light ("TL") for use in controlling an autonomous vehicle are described herein. Implementations can generate a corresponding numerical measure, for each of multiple candidate states of the TL, based on processing an image capturing a region that is predicted to include the TL using machine learning classifier(s). Implementations further generate a corresponding final measure, for each of the candidate states, based on processing each of the corresponding numerical measures using TL model(s), select one of the candidate states as a current state of the TL based on the final measures, and control the autonomous vehicle based on the current state of the TL. Notably, each of the corresponding final measures can be generated as a function of the corresponding numerical measures of the candidate states, and the corresponding numerical measures of the other candidate states.

19 Claims, 8 Drawing Sheets

(51) Int. Cl.
  *B60W 60/00* (2020.01)
  *G06V 20/58* (2022.01)
  *G06V 20/56* (2022.01)

(52) U.S. Cl.
  CPC ....... *B60W 2554/802* (2020.02); *G06V 20/56* (2022.01); *G06V 20/58* (2022.01); *G06V 20/582* (2022.01); *G06V 20/584* (2022.01)

(58) Field of Classification Search
  CPC .... G06V 20/58; G06V 20/582; G06V 20/584; G06V 20/586; G06V 20/588; G06V 20/59; G06V 20/593; G06V 20/597
  See application file for complete search history.

(56) References Cited

U.S. PATENT DOCUMENTS

| | | |
|---|---|---|
| 9,990,548 B2 | 6/2018 | Wellington |
| 10,762,360 B2* | 9/2020 | Silver .................. G06V 10/764 |
| 11,321,573 B1* | 5/2022 | Wendel ............... G06V 20/584 |
| 2013/0253754 A1 | 9/2013 | Ferguson et al. |
| 2015/0329107 A1* | 11/2015 | Meyer .................... G08G 1/095 |
| | | 701/28 |
| 2019/0018412 A1* | 1/2019 | Tschanz ............... G05D 1/0088 |
| 2019/0271983 A1* | 9/2019 | Lombrozo ........ B60W 60/0017 |
| 2019/0351897 A1* | 11/2019 | Gutmann ........... G08G 1/09623 |

\* cited by examiner

400A

RED STATE

| | LEARNED COEFFICIENTS | | | | |
|---|---|---|---|---|---|
| | RED | YELLOW | GREEN | OFF | NOT VISIBLE | EFFECTIVE DISTANCE | BIAS |
| FIRST WINDOW OF TIME | 0.50 | -0.20 | -0.05 | -0.10 | -0.02 | -0.02 | -0.06 |
| SECOND WINDOW OF TIME | 0.03 | 0.00 | -0.10 | -0.02 | -0.00 | -0.01 | -0.07 |

400B

GREEN STATE

| | LEARNED COEFFICIENTS | | | | |
|---|---|---|---|---|---|
| | RED | YELLOW | GREEN | OFF | NOT VISIBLE | EFFECTIVE DISTANCE | BIAS |
| FIRST WINDOW OF TIME | -0.08 | -0.20 | 0.66 | -0.02 | -0.03 | -0.03 | -0.02 |
| SECOND WINDOW OF TIME | 0.00 | -0.10 | 0.25 | -0.01 | -0.02 | -0.04 | -0.03 |

FIG. 4A

| | IMAGE 1 CURRENT TIME | IMAGE 2 50 MILLISECONDS AGO | ... | IMAGE N 500 MILLISECONDS AGO | VOTE |
|---|---|---|---|---|---|
| RED FINAL MEAS. | 0.058 | 0.045 | ... | -0.005 | 0.098 |
| ... | ... | ... | ... | ... | ... |
| GREEN FINAL MEAS. | -0.235 | -0.200 | ... | -0.105 | -0.540 |
| ... | ... | ... | ... | ... | ... |

DETERMINING CURRENT STATE OF TRAFFIC LIGHT(S) FOR USE IN CONTROLLING AN AUTONOMOUS VEHICLE

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate mapping data exists). Finally, Level 5 autonomy represents a level of autonomy where a vehicle is capable of operating free of operator control under any circumstances where a human operator could also operate.

The fundamental challenges of any autonomy-related technology relates to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

SUMMARY

The present disclosure is directed to particular method(s) and/or architecture(s) for determining a current state of at least one traffic light for use in controlling an autonomous vehicle. The current state of the traffic light can be selected from multiple candidate states of the traffic light. Some implementations generate a corresponding numerical measure for each of the multiple candidate states based on processing, using machine learning classifier(s), one or more images of region(s) that are predicted to include the traffic light. Those implementations further generate a corresponding final measure for each of the multiple candidate states based on further processing of the corresponding numerical measures for each of the multiple candidate states, and select a given one of the multiple candidate states as the current state based on the corresponding final measures. In some of those implementations, a control set associated with the traffic light can be used to control the autonomous vehicle based on the current state. For example, the current state of the traffic light can be compared to the control set associated with the traffic light to determine whether or not the autonomous vehicle may turn left at an intersection that includes the traffic light, pass through the intersection, turn right at the interaction, and/or perform other actions at the intersection.

Therefore, consistent with one aspect of the invention, a method implemented by one or more processors of an autonomous vehicle is described herein. The method may include processing an image using a machine learning classifier. The image may be captured by a vision component of the autonomous vehicle. Further, the image may be processed using the machine learning classifier based on the image capturing a region that is predicted to include a traffic light. The method may further include generating, based on processing the image using the machine learning classifier, a corresponding numerical measure for each of multiple candidate states of the traffic light, and generating, based on processing each of the corresponding numerical measures, a corresponding final measure for each of the candidate states. The method may further include selecting one of the candidate states as a current state of the traffic light. The selecting may be based on the corresponding final measures for the candidate states. The method may further include controlling the autonomous vehicle based on the selected current state of the traffic light.

These and other implementations of technology disclosed herein can optionally include one or more of the following features.

In some implementations, generating the corresponding final measure for each of the candidate states may include generating the corresponding final measure as a function of the corresponding numerical measure for a given candidate state of the candidate states, and the corresponding numerical measures for the other candidate states. Further, generating the corresponding final measure as a function of the corresponding numerical measure for the given candidate state, and the corresponding numerical measures for the other candidate states may include generating a corresponding candidate state value based on modifying the corresponding numerical measure, for the given candidate state, based on a coefficient that is specific to the given candidate state, generating corresponding other candidate state values based on modifying each of the corresponding numerical measures, for each of the other candidate states, based on corresponding other coefficients, for each of the other candidate states, that are also specific to the given candidate state, and generating the corresponding final measure as a function of the corresponding candidate state value and the corresponding other candidate state values.

In some versions of those implementations, the coefficient that is specific to the given candidate state and the other coefficients that are specific to the corresponding one of the other candidate states may be learned coefficients. In some further versions of those implementations, the learned coefficients may be generated based on performing an optimization process based on labeled training instances. In yet further versions of those implementations, generating the corresponding final measure for each of the candidate states further may include retrieving, from one or more databases, a prior corresponding numerical measure for each of the multiple candidate states of the traffic light, where the prior corresponding numerical measure for each of the multiple candidate states of the traffic light were previously generated based on processing one or more prior images, using the machine learning classifier, that capture the region that is predicted to include the traffic light. Further, generating the corresponding final measure may further be a function of the prior corresponding numerical measure for the given candidate state of the candidate states, and the prior corresponding numerical measures for the other candidate states.

In even further versions of those implementations, generating the corresponding final measure further as a function of the prior corresponding numerical measure for the given candidate state, and the prior corresponding numerical measures for the other candidate states may include generating a prior corresponding candidate state value based on modifying the prior corresponding numerical measure, for the given candidate state, based on an additional coefficient that is specific to the given candidate state, generating prior corresponding other candidate state values based on modifying each of the prior corresponding numerical measures, for each of the other candidate states, based on corresponding additional other coefficients, for each of the other candidate states, that are also specific to the given candidate state, and generating the corresponding final measure further as a function of the prior corresponding candidate state value and the prior corresponding other candidate state values.

In yet further versions of those implementations, the corresponding numerical measure for each of the multiple candidate states of the traffic light may be associated with a first window of time, and the prior corresponding numerical measure for each of the multiple candidate states of the traffic light may be associated with a second window of time. In even further versions of those implementations, the learned coefficients that are specific to the corresponding numerical measure for each of the multiple candidate states of the traffic light may be associated with the first window of time, and the additional coefficients that are specific to the prior corresponding numerical measure for each of the multiple candidate states of the traffic light may be associated with the second window of time.

In some versions of those implementations, the corresponding final measure may be further generated as a function of an effective distance to the traffic light included in the image captured by the vision component. The effective distance may be determined as a function of a number of pixels in the image that include at least a portion of the traffic light.

In some implementations, the method may further include comparing the selected current state of the traffic light to one or more historical states of the traffic light, and identifying, based on the comparing, a transition of the traffic light from a first state associated with one or more of the historical states to a second state associated with the current state. Further, controlling the autonomous vehicle may be further based on the identified transition of the traffic light.

In some implementations, the method may further include processing an additional image using the machine learning classifier. The additional image may be captured by an additional vision component of the autonomous vehicle, and processed using the machine learning classifier based on the additional image capturing the region that is predicted to include the traffic light. The additional image may be in addition to the image, and captured at or near the same time as the image. Further, the additional vision component may be in addition to the vision component. The method may further include generating, based on processing the additional image using the machine learning classifier, an additional corresponding numerical measure for each of multiple candidate states of the traffic light, and generating, based on processing each of the additional corresponding numerical measures, an additional corresponding final measure for each of the candidate states. Generating the additional corresponding final measure for each of the candidate states may include generating the additional corresponding final measure as a function of the additional corresponding numerical measure for the given candidate state of the candidate states, and the additional corresponding numerical measures for the other candidate states. Further, the selecting may be further based on the additional corresponding final measures for the candidate states.

In some implementations, the candidate states of the traffic light may include one or more of a first state indicative of a red state of the traffic light, a second state indicative of a yellow state of the traffic light, a third state indicative of a green state of the traffic light, a fourth state indicative of an off state of the traffic light, or a fifth state indicative of a not visible state of the traffic light.

In some implementations, the selected current state of the traffic light may be associated with one or more control sets, and each of the one or more control sets may be associated with a bulb pattern of the traffic light that influences when a first action can be performed by the autonomous vehicle at the traffic light. In some versions of those implementations, the traffic light may be one of a plurality of traffic lights of an intersection. Further, controlling the autonomous vehicle based on the selected current state of the traffic light may include controlling the autonomous vehicle based on the one or more control sets associated with the traffic light and one or more additional control sets associated with at least an additional traffic light, of the plurality of traffic lights, that is in addition to the traffic light.

In some further versions of those implementations, the one or more control sets associated with the traffic light may influence when a first action can be performed by the autonomous vehicle, and the one or more additional control sets associated with at least the additional traffic light may influence when a second action can be performed by the autonomous vehicle, and wherein the first action is distinct from the second action.

In some further versions of those implementations, the method may further include processing an additional image using the machine learning classifier. The additional image may be captured by the vision component of the autonomous vehicle, and processed using the machine learning classifier based on the image capturing an additional region that is predicted to include the additional traffic light. The method may further include generating, based on processing the additional image using the machine learning classifier, an additional corresponding numerical measure for each of multiple candidate states of the additional traffic light, and generating, based on processing each of the additional corresponding numerical measures, an additional corresponding final measure for each of the candidate states of the additional traffic light. Generating the corresponding final measure for each of the candidate states of the additional traffic light may include generating the additional corresponding final measure as a function of the additional corresponding numerical measure for the given candidate state of the candidate states of the additional traffic light, and the additional corresponding numerical measures for the other candidate states of the additional traffic light. The method may further include selecting one of the candidate states of the additional traffic light as a current state of the additional traffic light. The selecting may be based on the additional corresponding final measures for the candidate states of the additional traffic light. Further, the one or more additional control sets associated with at least the additional traffic light are based on the selected current state of the additional traffic light. In even further versions of those implementations, the image and the additional image may be cropped images from an original image of the intersection that includes plurality of traffic lights, and that is captured by the vision component of the autonomous vehicle.

Consistent with another aspect of the invention, a method implemented by one or more processors of an autonomous vehicle is described herein. The method may include identifying a corresponding numerical measure for each of multiple candidate states of a traffic light, and generating, based on processing each of the corresponding numerical measure, a corresponding final measure for each of the candidate states. Generating the corresponding final measure for each of the candidate states may include generating a corresponding candidate state value based on modifying a corresponding numerical measure, for a given candidate state, based on a coefficient that is specific to the given candidate state, generating corresponding other candidate state values based on modifying corresponding numerical measures, for each of the other candidate states, based on corresponding other coefficients, for each of the other candidate states, that are also specific to the given candidate state, and generating the corresponding final measure as a function of the corresponding candidate state value and the corresponding other candidate state values. The method may further include selecting, based on the corresponding final measures, one of the candidate states as a current state of the traffic light, and controlling the autonomous vehicle based on the selected current state of the traffic light.

These and other implementations of technology disclosed herein can optionally include one or more of the following features.

In some implementations, identifying the corresponding numerical measure for each of the multiple candidate states of the traffic light may include receiving predicted output that is generated based on processing an image using a machine learning classifier. Further, the image may capture a region that is predicted to include the traffic light. The method may further include identifying, based on the received predicted output, the corresponding numerical measure for each of the multiple candidate states of the traffic light.

Consistent with yet another aspect of the invention, a traffic light system of an autonomous vehicle is described herein. The traffic light system may include at least one processor, and at least one memory comprising instructions that, when executed, cause the at least one processor to process an image using a machine learning classifier. The image may be captured by a vision component of the autonomous vehicle, and processed using the machine learning classifier based on the image capturing a region that is predicted to include a traffic light. The instructions may further cause the at least one processor to generate, based on processing the image, a corresponding numerical measure for each of multiple candidate states of the traffic light, generate, based on processing each of the corresponding numerical measures, a corresponding final measure for each of the candidate states, and select, based on the corresponding final measures, one of the candidate states as a current state of the traffic light. The instructions may further cause the at least one processor to compare the selected current state of the traffic light to one or more historical states of the traffic light, identify, based on the comparing, a transition of the traffic light from a first state associated with one or more of the historical states to a second state associated with the current state, and control the autonomous vehicle based on the selected current state of the traffic light and the identified transition of the traffic light.

Consistent with a further aspect of the invention, a method implemented by one or more processors of an autonomous vehicle is described herein. The method may include generating a plurality of training instances, each of the training instances including training instance input and corresponding training instance output. The training instance input may include a corresponding numerical measure for each of multiple candidate states of a traffic light captured in an image. Further, the corresponding training instance output may include a ground truth state of the traffic light captured in the image. The method may further include identifying coefficients that are specific to a given candidate state, of the multiple candidate states, for each of the multiple candidate states, and training a traffic light model, for use by an autonomous vehicle, based on the plurality of training instances and based on the coefficients.

These and other implementations of technology disclosed herein can optionally include one or more of the following features.

In some implementations, training the traffic light model may include iteratively training the traffic light model based on the plurality of training instances and based on the coefficients. Further, during each iteration of the iteratively training of the traffic light model, the method may further include performing an optimization process to determine new coefficients, to replace the coefficients, that are also specific to the given candidate state, of the multiple candidate states, for each of the multiple candidate states. In some versions of those implementations, performing the optimization process to determine the new coefficients may be based on evaluating performance of the traffic light model during each iteration of training the traffic light model. Further, each iteration of training the traffic light model may include training the traffic light model using a given training instance of the plurality of training instances. In some versions of those implementations, the optimization process may be performed using a black-box optimizer.

In some implementations, training the traffic light model may include batch training the traffic light model based on the plurality of training instances and based on the coefficients. Further, during each batch of the batch training of the traffic light model, the method may further include performing an optimization process to determine new coefficients that are specific to the given candidate state, of the multiple candidate states, for each of the multiple candidate states. In some versions of those implementations, performing the optimization process to determine the new coefficients may be based on evaluating performance of the traffic light model during each batch of training the traffic light model. Further, each batch of training the traffic light model comprises training the traffic light model using a multiple training instances of the plurality of training instances. In some versions of those implementations, the optimization process may be performed using a black-box optimizer.

In some implementations, subsequent to training the traffic light model, the method may further include receiving, from one or more vision components of the autonomous vehicle, an image that captures a given traffic light, generating, based on processing the image using a machine learning classifier, an additional corresponding numerical measure for each of the multiple candidate states of the given traffic light, and generating, based on processing each of the additional corresponding numerical measures, an additional corresponding final measure for each of the candidate states. The method may further include selecting, based on the additional corresponding final measures for the candidate states, one of the candidate states as a current state of the given traffic light, and controlling the autonomous vehicle based on the selected current state of the given traffic light.

In some versions of those implementations, generating the additional corresponding final measure for each of the candidate states may include generating the additional corresponding final measure as a function of the additional corresponding numerical measure for the given candidate state of the candidate states, and the additional corresponding numerical measures for the other candidate states. Further, generating the additional corresponding final measure as a function of the additional corresponding numerical measure for the given candidate state, and the additional corresponding numerical measures for the other candidate states may include generating a corresponding candidate state value based on modifying the additional corresponding numerical measure, for the given candidate state, based on a coefficient, of the coefficients, that is specific to the given candidate state, generating corresponding other candidate state values based on modifying each of the additional corresponding numerical measures, for each of the other candidate states, based on corresponding other coefficients, of the coefficients, for each of the other candidate states, that are also specific to the given candidate state, and generating the additional corresponding final measure as a function of the corresponding candidate state value and the corresponding other candidate state values.

In some versions of those implementations, the method may further include identifying an additional image that previously captured the given traffic light. The image may be associated with a first window of time, and the additional image may be associated with a second window time that is distinct from the first window of time, and that temporally precedes the first window of time. In some further versions of those implementations, the image captured in the first window of time may be associated with the coefficients, and the additional image captured in the second window of time may be associated with additional coefficients that are also specific to the given candidate state, of the multiple candidate states, for each of the multiple candidate states. In yet further versions of those implementations, one or more of the additional coefficients may be heuristically defined.

In some implementations, the training instance input may further include an effective distance to the traffic light captured in the image. In some versions of those implementations, the effective distance to the traffic light captured in the image may be determined as a function of a number of pixels, in the image, that include at least a portion of the traffic light.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4A illustrates example tables of learned coefficients for multiple windows of times for multiple candidate states of a traffic light, in accordance with various implementations.

FIG. 4B illustrates an example table of using the tables of the learned coefficients for the multiple windows of times from FIG. 4A in selecting a current state of the traffic light, in accordance with various implementations.

DETAILED DESCRIPTION

Figure 1:
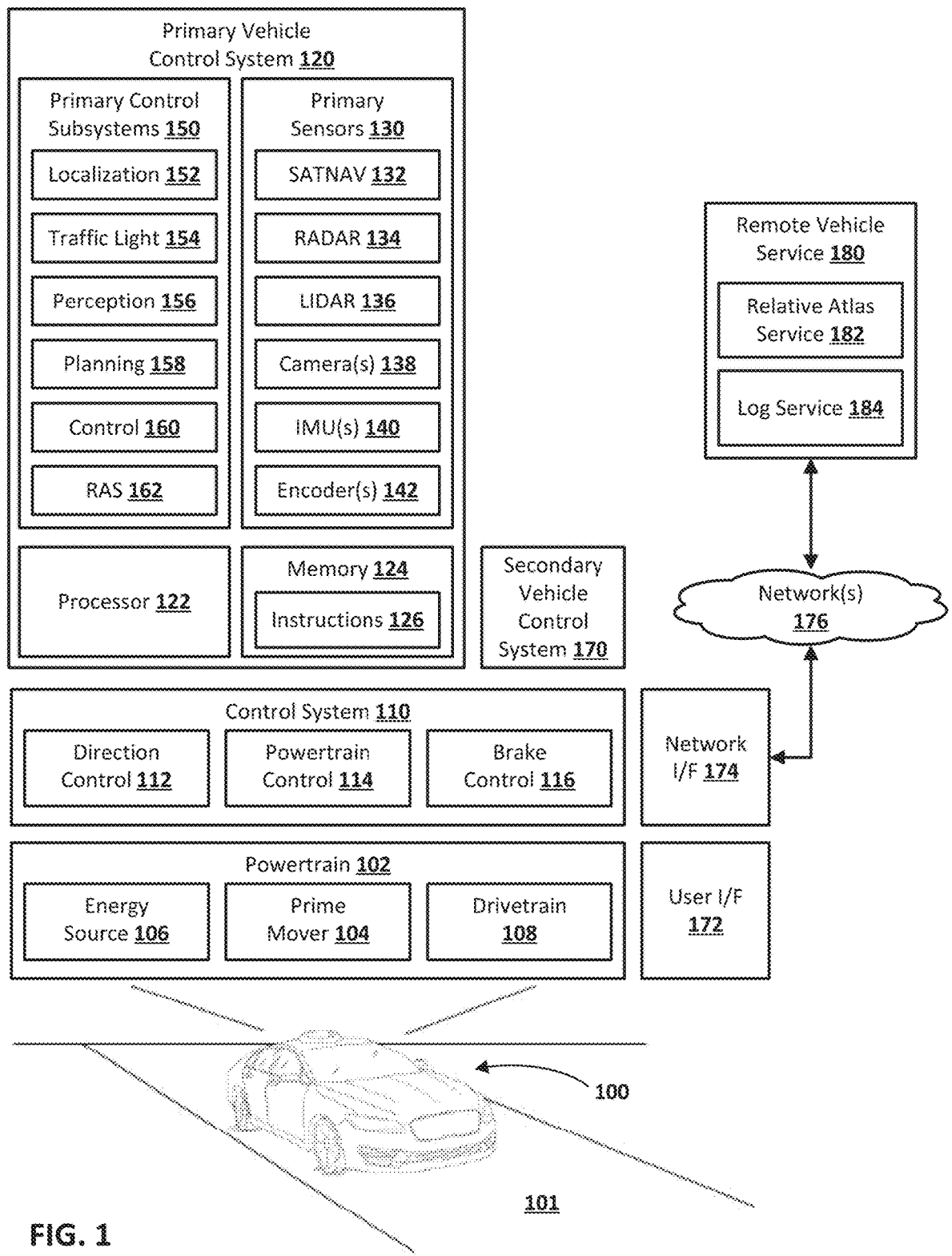
FIG. 1 illustrates an example hardware and software environment for an autonomous vehicle, in accordance with various implementations.

In various implementations, determining a current state of at least one traffic light for use in controlling an autonomous vehicle includes processing an image, that captures a region of an environment of the autonomous vehicle that is predicted to include the at least one traffic light, to generate predicted output(s), and processing the predicted output(s) using traffic light model(s) to determine the current state of the at least one traffic light. In some of those implementations, the traffic light model(s) can include functions for generating a corresponding final measure for each of multiple candidate states, and the current state can be selected based on the final measures.

An intersection of interest can be an intersection that includes one or more traffic lights, and that the autonomous vehicle is currently navigating or that the autonomous vehicle will navigate through in the near future. The intersection of interest associated with the at least one traffic light can be identified from a stored mapping of the environment of the autonomous vehicle based on a pose instance of the autonomous vehicle, and can include location and/or orientation information of the autonomous vehicle with respect to the environment of the autonomous vehicle. Further, intersection data stored in association with the intersection of interest can be identified from the mapping, and can include at least location(s) assigned to traffic light(s) of the intersection of interest, configuration(s) assigned to the intersection of interest, and/or control set(s) associated with each of the traffic light(s) of the intersection of interest. Further, the region of the environment of the autonomous vehicle that is predicted to include the at least one traffic light captured in the image can be identified based on the location(s) assigned to the at least one traffic light.

In various implementations, the predicted output(s) generated based on processing the image can include a corresponding numerical measure for each of multiple candidate states of the at least one traffic light. The corresponding numerical measures for the multiple candidate states can be processed, using the functions of the traffic light model(s), to generate the corresponding final measure for each of the multiple candidate states. Each of the functions of the traffic light model(s) can modify the corresponding numerical measures to generate corresponding final measures for each of the candidate states. Further, the corresponding final measure for each of the multiple candidate states can be determined as a function of a corresponding state value for a given candidate state and corresponding state values for each of the other candidate states. The corresponding state values can be determined using learned coefficients of the functions. For example, assume the predicted output(s) include a feature vector having corresponding numerical measures of [0.2, 0.4, 0.1, 0.1, 0.1] for candidate states of [red, yellow, green, off, not visible], respectively. In this example, a first function associated with determining a corresponding final measure associated with a red state can modify the corresponding numerical measure associated with the red state (e.g., 0.2) using a first learned coefficient associated with first function and for the red state, modify the corresponding numerical measure associated with the yellow state (e.g., 0.4) using a second learned coefficient associated with the first function for the yellow state, and so on to generate the corresponding final measure associated with the red state. Further, in this example, a second function associated with determining a corresponding final measure associated with a yellow state can modify the corresponding numerical measure associated with the red state (e.g., 0.2) using a first additional learned coefficient associated with second function and for the red state, modify the corresponding numerical measure associated with the yellow state (e.g., 0.4) using a second additional learned coefficient associated with the second function for the yellow state, and so on to generate the corresponding final measure associated with the yellow state. This process can be repeated to generate the corresponding final measure(s) for each of the multiple candidate states.

Moreover, in some versions of those implementations, prior corresponding numerical measures can also be processed using the functions of the traffic light model(s), and corresponding coefficients, to generate the corresponding final measure for each of the multiple candidate states. The prior corresponding numerical measures can be associated with a disparate window of time (e.g., generated based on image(s) captured between 250 milliseconds and 400 milliseconds ago), and can influence the corresponding final measures generated based on the corresponding numerical measures. By factoring in the prior corresponding numerical measures, various costs can be factored into generating the corresponding final measures. For example, if the prior corresponding numerical measures indicate that a state of a given traffic light was green 300 milliseconds ago, then the current state of the given traffic light cannot be red since a duration the yellow state of any traffic light is longer than 300 milliseconds. Thus, the accuracy of a traffic light system of the autonomous vehicle can be greatly improved.

Prior to further discussion of these implementations, however, an example hardware and software environment within which the various techniques disclosed herein may be implemented will be discussed.

Turning to the drawings, wherein like numbers denote like parts throughout the several views, FIG. 1 illustrates an example autonomous vehicle 100 within which the various techniques disclosed herein may be implemented. Vehicle 100, for example, is shown driving on a road 101, and vehicle 100 may include powertrain 102 including prime mover 104 powered by energy source 106 and capable of providing power to drivetrain 108, as well as control system 110 including direction control 112, powertrain control 114 and brake control 116. Vehicle 100 may be implemented as any number of different types of vehicles, including vehicles capable of transporting people and/or cargo, and capable of traveling by land, by sea, by air, underground, undersea and/or in space, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, prime mover 104 may include one or more electric motors and/or an internal combustion engine (among others), while energy source 106 may include a fuel system (e.g., providing gasoline, diesel, hydrogen, etc.), a battery system, solar panels or other renewable energy source, a fuel cell system, etc., and the drivetrain 108 may include wheels and/or tires along with a transmission and/or any other mechanical drive components suitable for converting the output of prime mover 104 into vehicular motion, as well as one or more brakes configured to controllably stop or slow the vehicle and direction or steering components suitable for controlling the trajectory of the vehicle (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used, e.g., in the case of electric/gas hybrid vehicles, and in some instances multiple electric motors (e.g., dedicated to individual wheels or axles) may be used as a prime mover. In the case of a hydrogen fuel cell implementation, the prime mover may include one or more electric motors and the energy source may include a fuel cell system powered by hydrogen fuel.

Direction control 112 may include one or more actuators and/or sensors for controlling and receiving feedback from the direction or steering components to enable the vehicle to follow a desired trajectory. Powertrain control 114 may be configured to control the output of powertrain 102, e.g., to control the output power of prime mover 104, to control a gear of a transmission in drivetrain 108, etc., thereby controlling a speed and/or direction of the vehicle. Brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, the invention is not limited to the particular application of the herein-described techniques in an autonomous wheeled land vehicle.

In the illustrated implementation, autonomous control over vehicle 100 (which may include various degrees of autonomy as well as selectively autonomous functionality) is primarily implemented in a primary vehicle control system 120, which may include one or more processors 122 and memory 124, with processors 122 configured to execute program code instructions 126 stored in memory 124.

Primary sensor system 130 may include various sensors suitable for collecting information from a vehicle's surrounding environment for use in controlling the operation of the vehicle. For example, satellite navigation (SATNAV)

sensor 132, e.g., compatible with any of various satellite navigation systems such as GPS, GLONASS, Galileo, Compass, etc., may be used to determine the location of the vehicle on the Earth using satellite signals. Radio Detection And Ranging (RADAR) and Light Detection and Ranging (LIDAR) sensors 134, 136, as well as a camera(s) 138 (which may include various types of vision components capable of capturing still and/or video imagery), may be used to sense stationary and moving objects within the immediate vicinity of a vehicle. Inertial measurement unit (IMU) 140 may include multiple gyroscopes and accelerometers capable of detection linear and rotational motion of a vehicle in three directions, while wheel encoder(s) 142 may be used to monitor the rotation of one or more wheels of vehicle 100.

The outputs of sensors 132-142 may be provided to a set of primary control subsystems 150, including, localization subsystem 152, traffic light subsystem 154, perception subsystem 156, planning subsystem 158, control subsystem 160, and relative atlas subsystem (RAS) 160. Localization subsystem 152 is principally responsible for precisely determining the location and orientation (also sometimes referred to as "pose", which in some instances may also include one or more velocities and/or accelerations) of vehicle 100 within its surrounding environment, and generally within some frame of reference. As will be discussed in greater detail herein, traffic light subsystem 154 is principally responsible for identifying intersections and traffic light(s) associated therewith, and processing a stream of vision data corresponding to images of the traffic light(s) to determine a current state of each of the traffic light(s) of the intersection for use by planning, control, and RAS subsystems 158-162, while perception subsystem 156 is principally responsible for detecting, tracking, and/or identifying elements within the environment surrounding vehicle 100. In some implementations, traffic light subsystem 154 may be a subsystem of perception subsystem 156, while in other implementation, traffic light subsystem is a standalone subsystem. Control subsystem 160 is principally responsible for generating suitable control signals for controlling the various controls in control system 110 in order to implement the planned path of the vehicle.

In addition, Relative Atlas Subsystem (RAS) 162 may be provided in the illustrated implementations to describe the elements within an environment and the relationships therebetween. Further, RAS 162 may be accessed by each of the localization, traffic light, planning, and perception subsystems 152-158 to obtain information about the environment for use in performing their respective functions. Moreover, RAS 162 may interact with remote vehicle service 184, over network(s) 176 via network interface (network I/F) 174.

It will be appreciated that the collection of components illustrated in FIG. 1 for primary vehicle control system 120 is merely exemplary in nature. Individual sensors may be omitted in some implementations, multiple sensors of the types illustrated in FIG. 1 may be used for redundancy and/or to cover different regions around a vehicle, and other types of sensors may be used. Likewise, different types and/or combinations of control subsystems may be used in other implementations. Further, while subsystems 152-162 are illustrated as being separate from processors 122 and memory 124, it will be appreciated that in some implementations, some or all of the functionality of subsystems 152-162 may be implemented with program code instructions 126 resident in memory 124 and executed by one or more of processors 122. Further, these subsystems 152-162 may in some instances be implemented using the same processors and/or memory, while in other instances may be implemented using different processors and/or memory. Subsystems 152-162 in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize common circuitry, processors, sensors and/or other components. Further, the various components in primary vehicle control system 120 may be networked in various manners.

In some implementations, vehicle 100 may also include a secondary vehicle control system 170, which may be used as a redundant or backup control system for vehicle 100. In some implementations, secondary vehicle control system 170 may be capable of fully operating vehicle 100 in the event of an adverse event in primary vehicle control system 120, while in other implementations, secondary vehicle control system 170 may only have limited functionality, e.g., to perform a controlled stop of vehicle 100 in response to an adverse event detected in primary vehicle control system 120. In still other implementations, secondary vehicle control system 170 may be omitted.

In general, an innumerable number of different architectures, including various combinations of software, hardware, circuit logic, sensors, networks, etc. may be used to implement the various components illustrated in FIG. 1. Each of processors 122 may be implemented, for example, as central processing unit(s) (CPU(s)), graphics processing unit(s) (GPU(s)), tensor processing unit(s) (TPU(s)), and/or any combination thereof, and each portion of memory 124 may represent random access memory (RAM) devices comprising a main storage, as well as any supplemental levels of memory, e.g., cache memories, non-volatile or backup memories (e.g., programmable or flash memories), read-only memories, etc. In addition, each portion of memory 124 may be considered to include memory storage physically located elsewhere in vehicle 100, e.g., any cache memory in a processor, as well as any storage capacity used as a virtual memory, e.g., as stored on a mass storage device or on another computer or controller. One or more of processors 122 illustrated in FIG. 1, or entirely separate processors, may be used to implement additional functionality in vehicle 100 outside of the purposes of autonomous control, e.g., to control entertainment systems, to operate doors, lights, convenience features, etc.

In addition, for additional storage, vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, and/or a tape drive, among others. Furthermore, vehicle 100 may include a user interface 172 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface, e.g., from a remote operator.

Moreover, vehicle 100 may include one or more network interfaces, e.g., network interface 174, suitable for communicating with network(s) 176 (e.g., a LAN, a WAN, a wireless network, Bluetooth, and/or the Internet, among others) to permit the communication of information with other vehicles, computers, and/or electronic devices, including, for example, a central service, such as a cloud service, from which vehicle 100 receives environmental and other data for use in autonomous control thereof. In the illustrated implementations, for example, vehicle 100 may be in communication with a cloud-based remote vehicle service 180 including, at least for the purposes of implementing various functions described herein, a relative atlas service 182 and a log collection service 184. Relative atlas service 182 may be used, for example, to maintain a global repository describing one or more geographical regions of the world, as well as to deploy portions of the global repository to one or more autonomous vehicles, to update the global repository based upon information received from one or more autonomous vehicles, and to otherwise manage the global repository. Log service 184 may be used, for example, to collect and/or analyze observations made by one or more autonomous vehicles during operation, enabling updates to be made to the global repository, as well as for other purposes.

Each of processors 122 illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail herein. Moreover, various applications, programs, objects, modules, and/or other components may also execute on one or more processors in another computer coupled to vehicle 100 via network(s) 176, e.g., in a distributed, cloud-based, or client-server computing environment, whereby the processing required to implement the functions of a computer program may be allocated to multiple computers and/or services over a network. Further, in some implementations data recorded or collected by a vehicle may be manually retrieved and uploaded to another computer or service for analysis.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while the invention has and hereinafter will be described in the context of fully functioning computers and systems, it will be appreciated that the various implementations described herein are capable of being distributed as a program product in a variety of forms, and that the invention applies equally regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program codes described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2A:
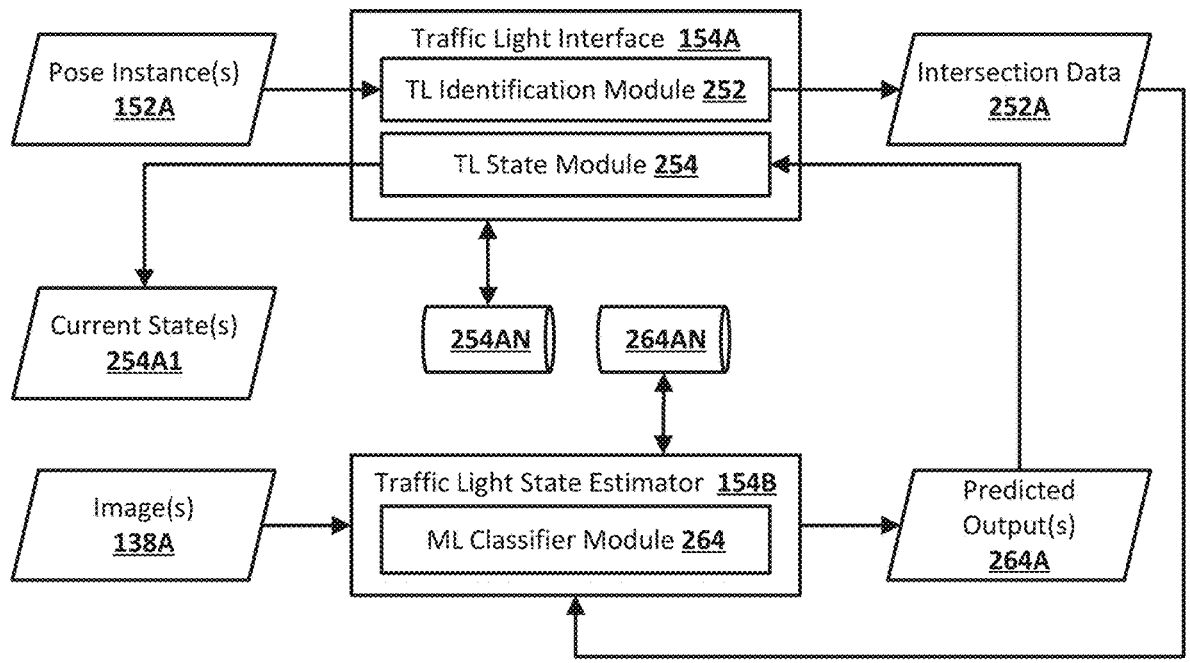
FIGS. 2A and 2B are block diagrams illustrating example implementations of the traffic light subsystem referenced in FIG. 1, in accordance with various implementations.
Figure 2B:
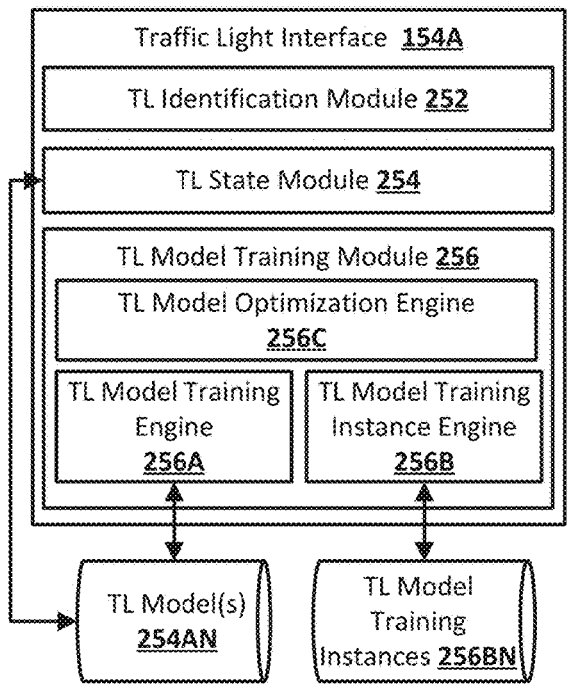

Turning to FIGS. 2A and 2B, block diagrams illustrating example implementations of traffic light subsystem 154 referenced in FIG. 1 are depicted. As shown in FIG. 2A, traffic light subsystem 154 can include traffic light interface 154A and traffic light state estimator 154B. Data generated by sensors of primary sensor system 130 and/or other subsystems of vehicle 100 can be received by traffic light interface 154A and/or traffic light state estimator 154B. The data can include, for example, pose instances generated by localization subsystem 152, vision data corresponding to image(s) 138A captured via vision components associated with camera(s) 138 of vehicle 100, intersection data representing previously mapped portions of an environment, and/or other data generated by other sensors or subsystems of vehicle 100. Traffic light interface 154A and/or traffic light state estimator 154B can generate output based on the received data, and can transmit the generated output therebetween and/or to various subsystems of vehicle (e.g., perception subsystem 156, planning subsystem 158, control subsystem 160, RAS subsystem, and/or other subsystems of vehicle 100).

The generated output can include, for example, intersection data associated with an intersection of interest for an autonomous vehicle, predicted output(s) associated with candidate states of traffic light(s), current state(s) of the traffic light(s), a control set associated with the current state(s) of the traffic light(s), a duration of time since a last transition of the traffic light(s), flashing pattern(s) of the traffic light(s), and/or any other output described herein that is generated by traffic light interface 154A and/or traffic light state estimator 154B. The states of the traffic lights at any given time instance can include, for example, a red state, a red arrow state, a yellow state, a yellow arrow state, a green state, a green arrow state, an off state, a not visible state, and/or any other state(s) of traffic lights. Further, the candidate states of the traffic light(s) can include one or more of the states, and the current state can be any given one of the candidate states or a flashing state determined based on historical state(s) of a given one of the traffic light(s).

Referring specifically to FIG. 2A, traffic light interface 154A may include traffic light (TL) identification module 252 and TL state module 254 as depicted in FIG. 2A. Traffic light interface 154A can identify an intersection of interest for vehicle 100 and intersection data 252A associated therewith using TL identification module 252. The intersection of interest can be an intersection that includes traffic light(s), and that vehicle 100 is currently navigating or that vehicle 100 will navigate through in the near future. TL identification module 252 can receive pose instance(s) 152A generated by localization subsystem 152 of vehicle 100. The pose instance(s) 152A can each include, for example, location and/or orientation information of vehicle 100 at a given instance of time with respect to an environment of vehicle 100.

Moreover, TL identification module 252 can also receive at least a portion of an atlas associated with the received pose instance. The atlas can be a stored mapping of various geographical areas and features of the geographical areas. The features of the geographical areas can include, for example, landmarks and data associated therewith, roads and data associated therewith, intersections and data associated therewith, and/or any other features of the geographical area that can be stored in the mapping. The received portion of the atlas can include an environment of vehicle 100 as indicated by the pose instance(s) 152A of vehicle 100. For example, TL identification module 252 can determine an environment of vehicle 100 is included in the portion of the atlas based on the location information included in the pose instance(s) 152A, and can determine a direction of travel of vehicle 100 in the environment based on the orientation information included in the pose instance(s) 152.

Further, TL identification module 252 can identify intersection data 252A associated with an intersection of interest. The intersection data 252A can be stored in association with the intersection of interest in the atlas. Further, the intersection data 252A can include, for example, a type of intersection, height and width information associated with the intersection of interest, a number of traffic lights included in the intersection, a pose (position and/or orientation) of the traffic lights, configurations assigned to one or more of the traffic lights, control set(s) associated with one or more of the traffic lights, temporal constraint(s) associated with one or more of the traffic lights, and/or other data related to the intersection of interest. The identified intersection data 252A associated with the intersection of interest can be transmitted to traffic light state estimator 154B.

The type of intersection can include an indication that the intersection of interest is a four-way intersection, Y-intersection, T-intersection, a traffic circle, a turning lane, and/or any other type of intersection that includes traffic light(s). The number of traffic lights can include a total number of traffic lights at the intersection of interest (i.e., one or more traffic lights that control all directions of traffic), or a subset of the total number of traffic lights that include only the traffic lights relevant to controlling vehicle 100 (i.e., one or more traffic lights that influence control of vehicle 100 in the direction of travel of vehicle 100).

The pose(s) of the traffic light(s) can include (also referred to as location(s)), for example, height and width information of the traffic lights (optionally relative to the height and width information of the intersection of interest) with respect to the environment of vehicle 100, an area (e.g., 2-D, 2.5D, or 3D area) within the environment of vehicle 100 assigned to each of the traffic lights, and/or other information for defining the location(s) of the traffic light(s). Further, the location(s) of the traffic light(s) can be initially defined in the mapping based on sensor data generated in previously mapping the intersection of interest (e.g., vision data from camera(s) and/or other vision components, LIDAR data from a LIDAR sensor, and/or other sensor data generated by other sensors of vehicle 100), and/or heuristically defined in the mapping. Moreover, the location(s) included in the intersection data 252A enable the TL identification module 252 to identify region(s), in image(s) that capture the traffic light(s) in the environment of vehicle 100, and that are predicted to include a corresponding traffic light based on the pose instance(s) 152A. For example, the height and width information of the traffic light(s) (and optionally with respect to the height and width information of the intersection of interest) can include a height and width of each of the traffic lights and/or a midpoint of the height and a midpoint of the width of each of the traffic lights. In this example, TL identification module 252 can use one or more geometric matching techniques to identify the region(s) associated with the height and width information of each of the traffic lights captured in the image. As another example, the area within the environment of vehicle 100 assigned to each of the traffic lights can include a centroid of the area, a bounding box associated with the area, and/or other techniques for defining areas in space. In this example, TL identification module 252 can use one or more geometric matching techniques to identify the region(s) associated with the area of each of the traffic light(s) captured in the image.

The configuration(s) assigned to the one or more traffic lights can include features of the traffic lights, and can be one of multiple disparate configurations in a taxonomy of configurations. The multiple disparate configurations in the taxonomy are mutually exclusive and are each visually differentiable from one another. Each configuration can include a unique combination of bulb(s), unique placement of bulb(s), unique bulb types, and/or unique orientation(s) of bulb(s)—relative to all other configurations. The bulb patterns can include any number of bulbs in any combination of patterns for a traffic light. The types of the traffic light can include, for example, a standalone traffic light, a traffic light connected to pole or post, and so on, and the orientation of the traffic light can include, for example, vertical, horizontal, angled, and/or other orientations. For example, a first configuration in the taxonomy can include vertical traffic lights having three bulbs, a second configuration in the taxonomy can include vertical lights having five bulbs, a fourth configuration in the taxonomy can include vertical traffic lights having three bulbs, and so on for any combination of orientations and/or bulb patterns of traffic lights.

The control sets associated with the one or more traffic lights can be associated with one or more bulb patterns for each of the traffic lights that influence one or more actions of the autonomous vehicle at the intersection of interest. Put another way, the control sets associated with the one or more traffic lights can include semantic representations of one or more bulb patterns of a given traffic light that govern the one or more actions that the autonomous vehicle can perform at the intersection of interest. The actions of the autonomous vehicle can include, for example, a left turn action, a U-turn action, a right turn action, a pass through action, a veer left action, a veer right action, and/or any other action that can be taken by the autonomous vehicle at an intersection based on a state of the traffic lights. Further, the control sets can also include an identifier associated with a given action of the autonomous vehicle. For example, control sets associated with a left turn action or U-turn action may be identified as left control sets, control sets associated with a pass through action may be identified as main control sets, control sets associated with a right turn action may be identified as right control sets, and so on.

In some implementations, a single control set can be associated with a given traffic light. For example, if a given traffic light controls a left turn action and the given traffic light includes a red arrow, yellow arrow, and green arrow, then a left control set associated with the given traffic light may include a representation thereof, such as [red arrow, yellow arrow, green arrow], or more generally [red, yellow, green] since the bulbs are associated with the left control set, or simply [1,1,1] to indicate a number of bulbs for the given traffic light. In some implementations, multiple control sets can be associated with a given traffic light. For example, assume a given traffic light is a vertical traffic light having a bulb pattern of [red, yellow, yellow arrow, green, green arrow], that influence whether the autonomous vehicle can perform a pass through action or a right turn action. In this example, the given traffic light can be associated with a main control set of, for example, [red, yellow, green], and a right control set of, for example, [red, yellow arrow, green arrow].

The temporal constraint(s) associated with one or more of the traffic lights can include an indication of whether a given traffic light is associated with one or more temporal constraints, and, if so, an indication of the one or more temporal constraints. The temporal constraint(s) can include, for example, whether certain actions at the intersection of interest are prohibited during a given period of time, whether certain traffic lights at the intersection of interest are inactive during a given period of time, and so on. For example, if a left turn action is prohibited at a given traffic light of the intersection of interest between the hours of 4:00 PM and 6:00 PM, then the temporal constraints can include an indication that the left turn action cannot be taken at the intersection of interest between 4:00 PM and 6:00 PM. As noted above, the identified intersection data 252A associated with the intersection of interest can be transmitted to traffic light state estimator 154B.

Traffic light state estimator 154B can include machine learning (ML) classifier module 264 as depicted in FIG. 2A. In some versions of those implementations, traffic light state estimator 154B can process the intersection data 252A received from traffic light interface 154A along with vision data corresponding to one or multiple of the image(s) 138A received from one or more vision components of vehicle 100 (e.g., via camera(s) 138 of primary sensor system 130). The vision data corresponding to the image(s) 138A may be part of a stream of vision data corresponding to images that capture one or more traffic lights of the intersection of interest. Further the vision data corresponding to the image(s) 138A can include, for example, raw image data corresponding to RGB images, YUV images, black and white images, greyscale images, and/or other types of images. Further, the vision data corresponding to the image(s) 138A can optionally include a depth component.

Traffic light state estimator 154B can identify region(s), of the image(s) 138A of the intersection of interest, that are predicted to include one or more of the traffic lights of the intersection. Traffic light state estimator 154B can identify the region(s) based on the intersection data 252A, and, more particularly, based on the locations of the one or more traffic lights included in the intersection data 252A. For example, in implementations where the locations of the one or more traffic lights include areas of the environment assigned to the traffic lights as noted above, traffic light state estimator 154B can identify those areas in the image(s) 138A as the region(s) that are predicted to include one or more of the traffic lights. As another example, in implementations where the locations of the one or more traffic lights include the height and width information (and optionally relative to the height and width of the intersection) as noted above, traffic light state estimator 154B can identify an area of the image(s) 138A based on the height and width of one or more of the traffic lights as the region(s) that are predicted to include one or more of the traffic lights. In some further versions of those implementations, traffic light state estimator 154B can crop the image(s) 138A of the intersection of interest, that are captured via vision components associated with camera(s) 138 of vehicle 100 based on the identified region(s) that are predicted to include one or more of the traffic lights. The cropped image(s) from the image(s) 138A can each include one or more of the traffic light(s). Notably, a given one of the image(s) 138A may include multiple traffic lights of the intersection of interest, and traffic light state estimator 154B may crop the given one of the image(s) 138A into multiple cropped images, such that each of the cropped images includes a given one of the one or more traffic lights of the intersection of interest.

For example, the traffic light state estimator 154B can transform the image(s) 138A using one or more image transformation techniques, such as affine transformation techniques (e.g., rotating, scaling, translating, shearing, etc.), interpolation techniques (e.g., bilinear interpolation, nearest-neighbor interpolation, bicubic interpolation, etc.), and/or other image transformation techniques. By transforming the image(s) 138A, the traffic light state estimator 154B can normalize each of the image(s) 138A for subsequent processing by ML classifier(s) 264AN. For example, assume that subsequent processing of the image(s) 138A requires each of the image(s) 138A to be a certain size/dimension (e.g., 64×64, 96×96, 64×128, 128×64, and/or other sizes/dimensions that are square or non-square), and further assume a given one of the image(s) 138A is not the correct size/dimensions. In this example, the given one of the image(s) 138A can be scaled to the correct size/dimensions for the subsequent processing. Put another way, the image(s) 138A can be transformed such that the traffic light(s) included in the image(s) 138A appear as if they are being viewed from a front view.

Moreover, traffic light state estimator 154B can generate, based on processing the image(s) 138A and/or the cropped image(s) (referred to collectively hereinafter as "the image(s) 138A"), predicted output(s) 264A associated with one or more candidate states of the traffic lights using ML classifier module 264. ML classifier module 264 can generate the predicted output(s) 264A based on processing the one or multiple of the image(s) 138A using ML classifier(s) 264AN that are trained to generate the predicted output(s) 264A. ML classifier(s) 264AN can be one or more machine learning models trained to generate corresponding numerical measures for one or more candidate states of a given traffic light as the predicted output(s) 264A. The corresponding numerical measures are indicative of how likely the given traffic light is in a given one of the candidate states, and can include, for example, corresponding probabilities, corresponding log odd ratios, corresponding state scores, and/or any other numerical measure capable of encoding the candidate states of the given traffic light. Further, the machine learning models can include, for example, a feed forward neural network model having a plurality of convolution layers (i.e., a convolutional neural network (CNN)), a graph neural network, and/or any other machine learning model capable of processing images. The predicted output(s) 264A generated by ML classifier module 264 using ML classifier(s) 264AN may be a function of the training instances used in training ML classifier(s) 264AN. Moreover, predicted outputs generated during training of ML classifier(s) 264AN may be stored in TL model training instances database 256BN along with ground truth output corresponding to a state of a given traffic light for which the predicted outputs are generated. These predicted outputs may subsequently be used in training additional model(s) as described in more detail below (e.g., with respect to TL model(s) 254AN).

In some implementations, ML classifier(s) 264AN include one or more CNNs (i.e., a neural network that includes one or more convolutional layers) trained to generated predicted output(s) that indicate a corresponding numerical measure for each of multiple candidate states of the at least one traffic light. The corresponding numerical measures can be represented as, for example, a feature vector including the corresponding probability, corresponding state score, corresponding log odd ratio, and/or any other numerical measure for each of the candidate states (i.e., a numerical measure corresponding to states of [red, yellow, green, off, not visible]). In some other versions of those implementations, multiple CNNs may be trained to generate a corresponding numerical measure associated with a given one of the candidate states of a given traffic light. The corresponding numerical measure associated with the given candidate states can be represented as, for example, a numerical measure for the given candidate state. Put another way, a first CNN can be trained to generate a first numerical measure that a given traffic light is in a first state, a second CNN can be trained to generate a second numerical measure that the given traffic light is in a second state, and so on for each of the candidate states.

Traffic light state estimator 154B can transmit the predicted output(s) 264A, generated based on processing the image(s) 138A and/or the intersection data 252A using ML classifier(s) 264AN, to traffic light interface 154A. Traffic light interface 154A can determine, based on the predicted output(s) 264A, current state(s) 254A1 of one or more of the traffic lights of the intersection of interest using TL state module 254. More particularly, TL state module 254 can process the predicted output(s) 264A using TL model(s) 254AN to determine the current state(s) 254A1 of the given traffic light.

Referring to FIG. 2B, TL model(s) 254AN can be trained using TL model training module 256. TL model training module 256 can include TL model training engine 256A, TL model training instance engine 256B, and TL model optimization engine 256C as depicted in FIG. 2B. TL model training engine 256A is principally responsible for training TL model(s) 254AN using the training instances stored in TL model training instances database 256BN. Further, TL model training instance engine 256B is principally responsible for generating training instances, including training instance input and corresponding training instance output, and storing the training instances in TL model training instances database 256BN. Moreover, TL model optimization engine 256C is principally responsible for determining, based on evaluating performance of TL model(s) 254AN, new coefficients to be used by TL model(s) 254AN.

As noted above, predicted outputs generated during training of ML classifier(s) 264AN may be stored in TL model training instances database 256BN. TL model training instance engine 256B can generate training instances, including training instance input and training instance output, based on the predicted outputs stored in TL model training instances database 256BN. Each training instance input can include a given predicted output of the predicted outputs generated during training of ML classifier(s) 264AN as training instance input. Further, the training instance input can optionally include an effective distance to a given traffic light captured a corresponding one of the image(s) 138A for which the predicted outputs are generated. The effective distance can be determined, for example, as a function of a number of pixels in the corresponding one of the image(s) 138A that include at least a portion of the traffic light captured in the corresponding one of the image(s) 138A. For example, assume a first vision component of vehicle 100 captures a first image having 32 pixels that include at least a portion of a first traffic, and also assume a second vision component of vehicle 100 captures a second image, at or near the same time the first vision component captures the first image, having 16 pixels that include at least a portion of the first traffic light. In this example, a first effective distance for the first vision component can be determined as a function of the 32 pixels that include at least a portion of the first traffic light, and a second effective distance for the second vision component can be determined as a function of the 16 pixels that include at least a portion of the first traffic light.

Further, each corresponding training instance output can include ground truth output corresponding to the state of the given traffic light captured in the corresponding one of the image(s) 138A for which the predicted outputs of the training instance input are generated. For example, first training instance input can include predicted output generated based on an image of a first traffic light, and, assuming the state of the first traffic light in the image is the yellow state, corresponding first training instance output can include ground truth output corresponding to the yellow state of the first traffic light. As a further example, second training instance input can include predicted output generated based on an image of a second traffic light, and, assuming the state of the second traffic light in the image is the green state, corresponding second training instance output can include ground truth output corresponding to the green state of the second traffic light.

TL model(s) 254AN may be dependent on the predicted output(s) 264A that ML classifier(s) 264AN are trained to generate. For example, in implementations where ML classifier(s) 264AN are trained to generate a corresponding numerical measure for one or multiple candidate states (using either one or multiple CNNs as ML classifier(s) 264AN as discussed above), TL model(s) 254AN can be, for example, a multi-class classifier having one or more learned functions. The multi-class classifier can be, for example, k-nearest neighbors (kNN) classifier, a naïve Bayes classifier, a support vector machine (SVM), and/or any other multi-class classifier. TL model(s) 254AN can be trained using TL model training engine 256A based on training instances that are stored in TL model training instances database 256BN, and that are generated using TL model training instance engine 256B. For example, TL model training instance engine 256B can identify the corresponding numerical measures generated while training ML classifier(s) 264AN, and can use the corresponding numerical measures as training instance input and the ground truth output associated with the corresponding numerical measures for which the corresponding numerical measures are generated as corresponding training instance output.

In some versions of those implementations, TL state module 254 can generate, using TL model(s) 254AN, a corresponding final measure for each of the candidate states of a given traffic light based on the corresponding numerical measures for each of the multiple candidate states as a function of the corresponding numerical measure for a given one of the candidate states and the corresponding numerical measures for each of the other candidate states. More particularly, TL state module 254 can generate, using TL model(s) 254AN, a corresponding candidate state value, for each of the candidate states, by modifying the corresponding numerical measure, for the given candidate state, based on a coefficient that is associated with the given state, and that is specific to the given state. Further, TL state module 254 can generate, using TL model(s) 254AN, corresponding other candidate state values based on modifying each of the corresponding numerical measures, for each of the other candidate states, based on corresponding other coefficients that are associated with each of the candidate states, and that are specific to the given state. TL state module 254 can then generate, using TL model(s) 254AN, the corresponding final measure for the given candidate state as a function of the corresponding candidate state value and the corresponding other candidate state values, and the current state(s) 254A1 can be selected based on the corresponding final measures.

In some further versions of those implementations, the coefficients for each of the one or more functions used at inference can be coefficients learned through training TL model(s) 254AN through multiple iterations of batch training using TL model training engine 256A. TL model(s) 254AN can include one or more functions (e.g., learned and/or heuristically defined) that each include a plurality of coefficients, for a given one of the candidate states, specific to each of the candidate states. For example, a first function for generating the corresponding numerical measure for the red state can be associated with a first set of coefficients that includes a first coefficient specific to the red state, a second coefficient specific to the yellow state, a third coefficient specific to the green state, and so on for each of multiple candidate states. Further, final measures can be generated using the functions for each of the candidate states. Generating the corresponding final measures using the coefficients is discussed in greater detail herein (e.g., with respect to FIG. 4).

TL model optimization engine 256C can evaluate the generated final measures for the plurality of training instances in the batch. TL model optimization engine 256C can evaluate each of the final measures by comparing them to the corresponding ground truth output. For example, assume the batch training includes 100 training instances, assume the correct state of a corresponding traffic light was selected, using a first function associated with the red state, for 60 of the 100 training instances, and assume the correct state of the corresponding traffic light was selected, using a second function associated with the red state, for 75 of the 100 training instances. In this example, TL model optimization engine 256C can select the second function associated with the red state as having coefficients that result in selection of the correct state (e.g., based on selecting the correct state 15 more times than the first function). Further, TL model optimization engine 256C can identify new coefficients for a third function associated with the red state based on the coefficients associated with the selected second function using an optimizer. For example, a black-box optimizer can be utilized to determine, based on the coefficients associated with the selected second function, one or more new coefficients for the third function (or modify the coefficients of the first function). This optimization process may then be repeated to further modify the coefficients used by one or more functions of TL model(s) 254AN. In this manner, TL model optimization engine 256C can be utilized to learn coefficients that result in accurate selection of the correct state.

After training, TL state module 254 can process, using TL model(s) 254AN, given corresponding numerical measures for the candidate states of a given traffic to generate corresponding final measures for each of the candidate states. Moreover, in various implementations, TL state module 254 may also consider prior corresponding numerical measures for the candidate states of the given traffic light in generating the corresponding final measures for each of the candidate states. For example, TL state module 254 can sort the predicted output(s) 264A based on windows of time. For example, a first window of time can include corresponding numerical measures that are generated based on most recently captured images (e.g., images captured within the last 150 milliseconds), a second window of time can include prior corresponding numerical measures that are generated based on next most recently captured images (e.g., images captured between 150 milliseconds and 250 milliseconds ago), a third window of time can include yet prior corresponding numerical measures that are generated based on next most recently captured images (e.g., images captured between 250 milliseconds and 400 milliseconds ago), and so on.

Each window of time can be associated with one or more functions of TL model(s) 254AN that have distinct sets of learned coefficients. For example, the corresponding numerical measures and prior corresponding numerical measures that are generated based on images within a first window of time can be processed using a first one of TL model(s) 254AN, other prior corresponding numerical measures that are generated based on images within a second window of time can be processed using a second one of TL model(s) 254AN, and so on. Further, corresponding prior final measures generated based on the prior corresponding numerical measures can be combined with the corresponding measures in selecting the current state(s) 254A1 of a given traffic light. Notably, the corresponding prior final measures are generated at each iteration, rather than using the final measure that was previously generated for the prior corresponding numerical measures. Thus, not only are the corresponding numerical measures associated with a most recently captured image taken into consideration in selecting the current state(s) 254A1, but prior corresponding numerical measures are also taken into consideration.

Referring back to FIG. 2A, in some implementations, TL state module 254 can transmit the current state(s) 254A1 to various other subsystem(s) of vehicle 100. For example, TL state module 254 can transmit the current state(s) 254A1 to perception subsystem 156, planning subsystem 158, control subsystem 160, and/or other subsystems of vehicle 100 for use in controlling vehicle 100.

In some additional and/or alternative implementations, TL state module 254 can determine a control set associated with the current state(s) 254A1, and transmit the determined control set to the other subsystem(s) along with the current state(s) 254A1. The control set(s) associated with each of the traffic light(s) of the intersection of interest can be included in the intersection data 252A as discussed above. For example, if TL state module 254 selects the green state as the current state for a given traffic light, then the system can determine whether the selected green state is associated with a left control set, a main control set, a right control set, and/or other control set(s). In this example, if the green state is associated with a left control set, then vehicle 100 can perform a left turn action, but that is not indicative as to whether vehicle 100 can perform a pass through action or right turn action. Thus, images of each traffic light of the intersection of interest can be processed in a similar manner described above to determine a state of the intersection. The state of the intersection can include, for example, the current state(s) 254A1 for each control set associated with the traffic light(s) of the intersection of interest. In this manner, vehicle 100 can determine all possible actions that can be taken at the intersection of interest based on the one or more traffic lights of the intersection of interest.

Although traffic light subsystem 154 of FIGS. 2A and 2B is depicted as having traffic light interface 154A using TL model(s) 254AN distinct from traffic light state estimator 154B using ML classifier(s) 264AN, it should be understood that is for the sake of example and not meant to be limiting. In some implementations, traffic light interface 154A may be implemented on first hardware (e.g., primary vehicle control system 120 or secondary vehicle control system 170) and traffic light state estimator 154B may be implemented on second hardware distinct from the first hardware (e.g., the other of primary vehicle control system 120 or secondary vehicle control system 170). In other implementations, traffic light interface 154A and traffic light state estimator 154B can be distinct, but implemented on the same hardware. In yet other implementations, traffic light interface 154A and traffic light state estimator 154B can be combined, such that TL model(s) 254AN and ML classifier(s) 264AN are a combined end-to-end machine learning model that processes the image(s) 138A to generate the current state(s) 254A1.

Figure 3:
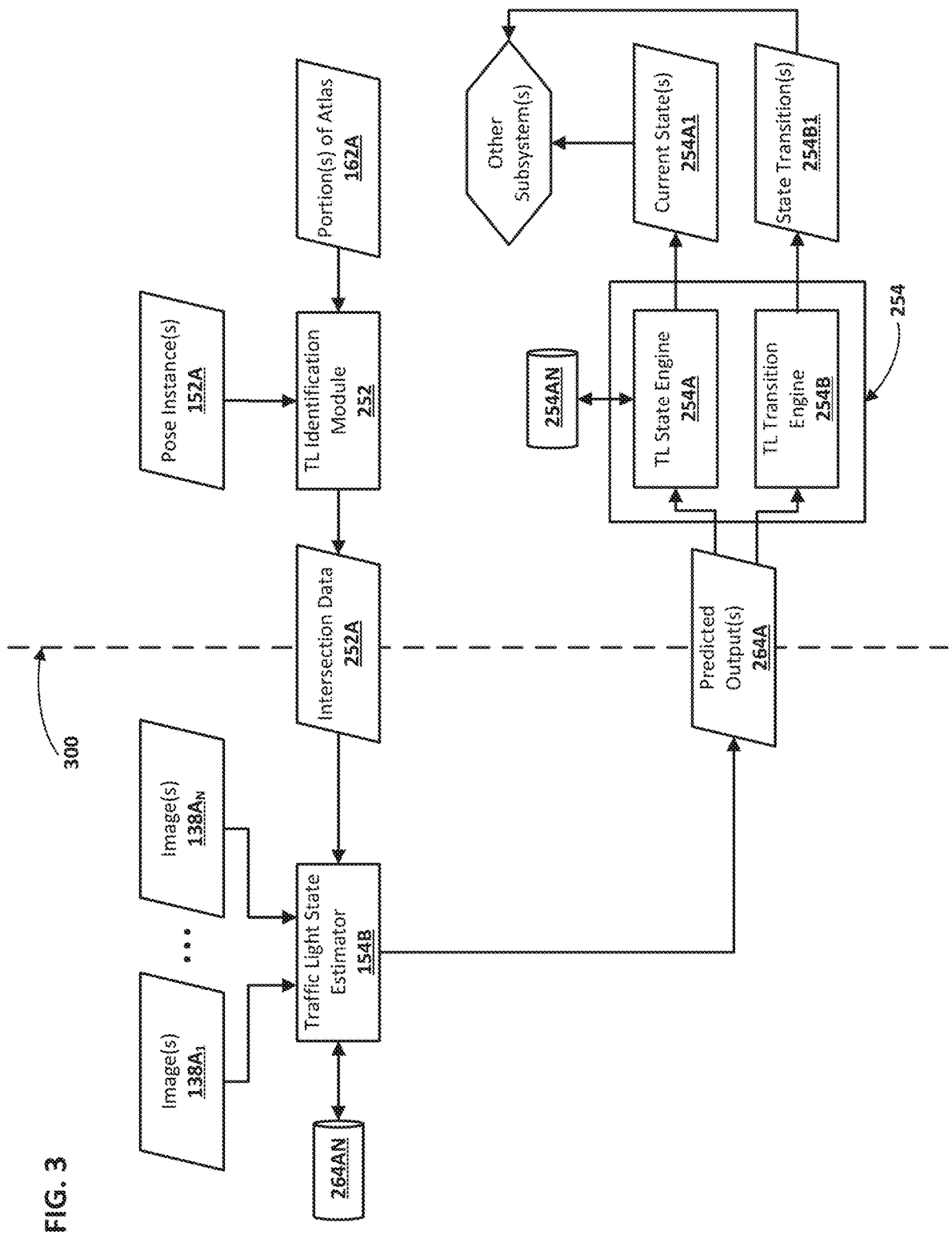
FIG. 3 is a process flow illustrating an example implementation of the traffic light subsystem referenced in FIGS. 2A and 2B, in accordance with various implementations.

Turning now to FIG. 3, a process flow illustrating an example implementation of the traffic light subsystem 154 referenced in FIGS. 2A and 2B is depicted. The process flow of FIG. 3 can be implemented by primary vehicle control system 120 and/or secondary vehicle control system 170. In particular, modules on the right side of dashed line 300 can be implemented by traffic light interface 154A of FIGS. 2A and 2B, and modules on the left side of the dashed line 300 can be implemented by traffic light state estimator 154B of FIG. 2A. Although the process flow of FIG. 3 is depicted as being implemented by traffic light interface 154A and a separate traffic light state estimator 154B, it should be understood that this is for the sake of example, and that traffic light interface 154A and separate traffic light state estimator 154B can be combined in various implementations.

TL identification module 252 can identify intersection data 252A based on pose instance(s) 152A of vehicle 100 and/or portion(s) of an atlas 162A that include a stored mapping of an environment of vehicle 100. More particularly, TL identification module 252 can identify an intersection of interest for vehicle 100 from the portion(s) of the atlas 162A based on the pose instance(s) 152A, and can identify the intersection data 252A stored in association with the intersection of interest from the portion(s) of the atlas 162A. The intersection data 252A is discussed in greater detail herein (e.g., with respect to FIG. 2A). The pose instance(s) 152A can include, for example, location and/or orientation information of vehicle 100 that indicates vehicle 100 is at or near the intersection of interest. Further, the portion(s) of the atlas 162A that include the stored mapping of the environment of vehicle 100 can be identified based on the pose instance(s) 152A of vehicle 100, and can include various features of the environment of vehicle 100. The features can include, for example, previously mapped landmarks, intersections, roads, and/or other features of the environment and data associated therewith. Thus, the portion(s) of the atlas 162A can include intersection data for a plurality of intersections in the environment of vehicle 100. TL identification module 252 can transmit the intersection data 252A to traffic light state estimator 154B.

Image(s) of one or more of traffic lights of the intersection of interest can be captured by one or more vision components of vehicle 100 at or near the same time (e.g., within a threshold amount of time of one another, such as within 50 milliseconds of another, 75 milliseconds of one another, and/or other durations of time), and respective frame rates. For example, a first vision component with a narrow field of view can capture image(s) 138A$_1$ of the given traffic light, and an Nth vision component with a wide field of view can capture image(s) 138A$_N$ of the given traffic at or near the same time as the first vision component, where N is a positive integer greater than one. Each of the image(s) 138A$_1$, 138A$_N$ can be annotated with a corresponding timestamp that can be used in subsequent processing of the image(s) 138A$_1$, 138A$_N$ and/or vision data associated with the image(s) 138A$_1$, 138A$_N$. Each of the image(s) 138A$_1$, 138A$_N$ can include one or more traffic lights of the intersection of interest, including the given traffic light.

Traffic light state estimator 154B can process, using ML classifier(s) 264AN and based on the intersection data 252A, the image(s) 138A$_1$, 138A$_N$ to generate predicted output(s). For example, traffic light state estimator 154B can identify, based on the locations of one or more of the traffic lights of the intersection of interest included in the intersection data 252A, a region that is predicted to include a corresponding one of the one or more traffic lights. Further, traffic light state estimator 154B can crop, based on the region that is predicted to include the corresponding one of the one or more traffic lights, each of the image(s) 138A$_1$, 138A$_N$, thereby resulting in cropped image(s) (referred to collectively hereinafter as "the image(s) 138A$_1$, 138A$_N$"). In some implementations, ML classifier(s) 264AN can include one or more trained CNNs as discussed above with respect to FIGS. 2A and 2B. For instance, vision data corresponding to the image(s) 138A$_1$, 138A$_N$ and/or the configurations can be applied as input across one or more of the CNNs to generate a corresponding numerical measure for multiple candidate states of one or more of the traffic lights as the predicted output(s) 264A. The predicted output(s) 264A for the one or more traffic lights of the intersection of interest can be transmitted to TL state module 254.

TL state module 254 can include TL state engine 254A. TL state engine 254A can determine current state(s) 254A1 of the one or more traffic lights of the intersection of interest using TL model(s) 254AN. Further, TL state module 254 can process the predicted output(s) 264A for the one or more traffic lights sequentially and/or in parallel. As noted above with respect to FIGS. 2A and 2B, TL model(s) 254AN may depend on the predicted output(s) 264AN that ML classifier(s) 264AN are trained to generate. For example, in implementations where ML classifier(s) 264AN are trained to generate a corresponding numerical measure for one of or multiple of the candidate states, TL model(s) 254AN may include one or more learned functions having a set of learned coefficients that is specific to each of the multiple candidate states as discussed above with respect to FIGS. 2A and 2B. In some versions of those implementations, the learned functions can generate corresponding state values for each of the multiple candidate states by modifying the corresponding numerical measures based on the set of corresponding learned coefficients for each of the multiple candidate state, and can generate a corresponding final measure for each of the multiple candidate states as a function of the corresponding state values. Further, TL state module 254 can select the current state(s) 254A1 of one or more of the traffic lights based on the corresponding final measure for each of the multiple candidate states.

In some implementations, TL state module 254 can further include TL transition engine 254B as depicted in FIG. 3. TL transition engine 254B can analyze historical states of one or more of the traffic lights, including the current state(s) 254A1 of one or more of the traffic lights to identify state transition(s) 254B1 of a given traffic light. In some versions of those implementations, the historical states of one or more of the traffic lights includes sequentially selected states that are temporally distinct to allow the state transition(s) 254B1 to be identified. Further, TL transition engine 254B can also determine a duration of time since a last transition of a given traffic light based on the annotated timestamps discussed above. For example, assume the last eight selected states for a given one of the one or more traffic lights of the intersection of interest are [red, red, red, green, green, green, green, green]. In this example, TL transition engine 254B can determine the given one of the one or more traffic lights of the intersection of interest transitioned from the red state to the green state. Moreover, TL transition engine 254B can use the duration of time since the last transition to infer future transitions. For example, if a given traffic light transitioned from the green state to the yellow state four seconds ago, TL transition engine 254B can infer that the given traffic light should transition from the yellow state to the red state in a very short amount of time. These inferences can also be used in controlling vehicle 100.

In some further versions of those implementations, TL state module 254 can also identify various pattern(s) of the traffic light, such as a flashing pattern. The flashing pattern can be identified based on a cycle period of transitions of a given traffic light. For example, assume the last eight selected states for a given one of the one or more traffic lights of the intersection of interest are [yellow, off, yellow, off, yellow, off, yellow, off] or [yellow, yellow, off, off, off, yellow, off, yellow]. In this example, TL transition engine 254B can determine the given one of the one or more traffic lights of the intersection of interest is in a yellow flashing state, as opposed to merely the yellow state or the off state based on the pattern of the historical states. Notably, the historical states of [yellow, yellow, off, off, off, yellow, off, yellow] does not strictly correspond to traditional "flashing" of "on-off-on-off" like the historical states of [yellow, off, yellow, off, yellow, off, yellow, off] in the above example. However, this may be the result of frame rates of vision components of the autonomous vehicle differing from the cycle period of the transitions of the given traffic light. However, it should be noted that TL transition(s) engine 254B can still detect the yellow flashing state based on the cycle period of the transitions. In other words, TL transition(s) engine 254B can determine that a given traffic light is in a first state for a first period of time, in a second state for a second period of time, and back to the first state for the first period of time, where the first period of time and the second period of time are substantially similar. For example, the cycle period of the transitions can be detected based on each of the states occurring a threshold number of times within a threshold number of historical states with some identifiable pattern. The state transition(s) 254B1 (and any identified flashing pattern(s)) can be transmitted to a plurality of other subsystem(s) for use in control of vehicle 100 in addition to the current state(s) 254A1. As another example, the cycle period of the transitions can be detected based on the traditional "flashing" of "on-off-on-off" for a first "on" period of time and a second "off" period of time without identifying the states occurring a threshold number of times within a threshold number of historical states as long as some identifiable pattern is detected.

Turning now to FIG. 4, example tables 400A and 400B of learned coefficients for multiple windows of times for multiple candidate states to be used in selecting a current state of a traffic light are illustrated. Notably, table 400A corresponds to learned coefficients that are specific to the red state for a first window of time and a second window of time, and table 400B corresponds to learned coefficients that are specific to the green state for a first window of time and a second window of time. Although FIG. 4 is described herein as using corresponding probabilities as corresponding numerical measures, it should be understood this is for the sake of example and is not meant to be limiting. For example, the corresponding numerical measures can additionally or alternatively be corresponding log odd ratios, corresponding state scores, and/or any other numerical measure capable of encoding the candidate states of a given traffic light.

In some implementations, the coefficients that are specific to the given states (e.g., the red state in table 400A and the green state in table 400B) for each of the windows of time can be learned using various optimization techniques as discussed in greater detail herein (e.g., with respect to TL optimization engine 256C of FIG. 2B). Further, each window of time for each of the candidate states can be associated with a corresponding function that utilizes the learned coefficients that are specific to that window of time and for that candidate state. Moreover, the windows of time represent an age of the corresponding probabilities. For example, any corresponding probabilities that are associated with images captured between a current time and 400 milliseconds prior to the current time can be associated with the first window of time, corresponding probabilities that are associated with images captured between 400 milliseconds and 800 milliseconds prior to the current time can be associated with the second window of time, and so on.

Although the preceding example utilizes between current time and 400 milliseconds as the first window of time and between 400 milliseconds and 800 milliseconds as the second window of time, different durations of the windows of time can be utilized. For instance, the first window of time can be from a current time up to 350 milliseconds, and the second window of time can be from 350 milliseconds to 750 milliseconds. Also, although the preceding example utilizes only two windows of time, only one window of time can be utilized, or more than two windows of time can be utilized (e.g., a first from 0 to 300 milliseconds, a second from 300 to 500 milliseconds, and a third from 500 milliseconds to 800 milliseconds), each with coefficients specific to the window and the candidate state.

In implementations where the machine learning classifier(s) are trained to generate corresponding probabilities for the multiple candidate states as discussed in greater detail herein (e.g., with respect to FIGS. 2A and 2B), the learned coefficients can be used to generate corresponding state values, for each of the multiple candidate states, that are specific to a given candidate state by modifying the corresponding probabilities using the learned coefficients. Further, a corresponding final measure for each of the candidate states can be generated based on the corresponding state values and using the corresponding function. Put another way, in generating a corresponding final measure for a given state of the multiple candidate states, a corresponding state value for the given state can be generated as a function of each of the corresponding probabilities for each of the multiple candidate states generated as a function of the corresponding probabilities, and the learned coefficients for each of the multiple candidate states that are specific to the given state. The corresponding final measure for each of the multiple candidate states can be determined in a similar manner, and the current state of a given traffic light can be determined based on the corresponding final measures for each of the multiple candidate states.

In some additional and/or alternative implementations, generating the corresponding final measures is further based on an effective distance and/or a bias term. The effective distance can be determined, for example, as a function of a number of pixels in a given image that is associated with the corresponding probabilities, and that includes at least a portion of the given traffic light captured in the given image. For example, assume the given image is a 96×96 image that includes the given traffic light, but only a 40×15 region of the 96×96 image includes a portion of the given traffic light. In this example, the effective distance can be determined as a function of the 40×15 region of the 96×96 image that includes the portion of the given traffic light. Further, the 40×15 region of the 96×96 image can be resized to a 96×96 image using the image transformation techniques described herein (e.g., with respect to FIGS. 2A and 2B), such that the image appears as if the given traffic light is being viewed from the front and such that minimal background imagery is included in the image processed by the ML classifier(s). Moreover, the bias term can be specific to each candidate state and/or each function, and can be used to tune each of the functions, thereby resulting in more accurate functions.

As one particular example, assume a given traffic light is in the red state, further assume the corresponding probabilities generated using the machine learning classifier(s) include [0.4, 0.2, 0.2, 0.1, 0.1] corresponding to probabilities for the candidate states of [red, yellow, green, off, not visible], respectively, and further assume the effective distance is 10. In this example, the learned coefficients of table 400A can be used to generate the corresponding state values, for each of the candidate states, that are specific to the red state by modifying the probabilities [0.4, 0.2, 0.2, 0.1, 0.1] according to the function associated with the first window of time for the red state. As one-non limiting example of this, the corresponding state values can be determined for each of the multiple candidate states based on multiplying the corresponding probabilities by the learned coefficients associated with the candidate states (e.g., 0.50×0.4 for the red state, −0.20×0.2 for the yellow state, −0.05×0.2 for the green state, −0.10×0.1 for the off state, and −0.02×0.1 for the not visible state), thereby resulting in the corresponding state values of [0.2, −0.04, −0.01, −0.01, −0.002] for the candidate states of [red, yellow, green, off, not visible], respectively. Further, a corresponding state value for the effective distance can be determined by multiplying the effective distance by the learned coefficient associated with the effective distance (e.g., −0.02×10), thereby resulting in the corresponding state value of [−0.02] for the effective distance. Further, the corresponding state values can be added together, along with the bias term (e.g., −0.06), to generate the corresponding final measure for the red state, thereby resulting in a corresponding final measure of 0.058 for the red state for the first window of time. This process using the above learned coefficients can be repeated for any other corresponding probabilities that are associated with images captured in the first window of time.

Moreover, this process can be repeated for any prior corresponding probabilities that are associated with images captured in the second window of time. However, the learned coefficients for the second window of time may differ from those for the first window of time as shown in FIG. 4. Generally, the farther the window of time from a current time, the less influence the corresponding state values, generated for the prior corresponding probabilities from those windows, will have on the current states. In some implementations, one or more of the coefficients associated with prior windows of time (e.g., the second window of time) can be heuristically defined, while other coefficient(s) can be learned (e.g., through optimization). Put another way, one or more coefficient(s) can be fixed, manually by a human, such that they remain static and are not learned during optimization. For example, the coefficient associated with the yellow state in the second window of time in table 400A is 0.00. This indicates that the function should not punish the selection of the red state for corresponding probabilities associated with the yellow state for the second window of time. Put another way, if the selected state of a given traffic light was the yellow state for an observation associated with the second window of time, then it is entirely plausible, and even likely, that the current state of the given traffic light is the red state.

Moreover, the corresponding final measures generated by other functions associated with other candidate states can also be used to vote for the current state. For example, the learned coefficients of table 400B can be used to generate the corresponding state values, for each of the candidate states, that are specific to the green state by modifying the probabilities [0.4, 0.2, 0.2, 0.1, 0.1] according to the function associated with the first window of time and the second window of time similar to that described above with respect to table 400A. Notably, the learned coefficients associated with the green state depicted in table 400B differ from those associated with the red state depicted in table 400A. Again, the coefficients are learned using one or more optimization techniques (e.g., as discussed in greater detail herein with respect to TL optimization engine 256C). The corresponding final measures generated using the functions associated with table 400B can then be used in selecting the current state of the traffic light.

In some implementations, the corresponding final measures generated using the corresponding functions associated with the first window of time and the second window of time can be used in selecting the current state of a given traffic light. As one non-limiting example, and as shown in table 400C of FIG. 4B, final measures for the candidate states for various images across the windows of time can be used to vote for the current state of the traffic light. For instance, assume the final measure for the red state for "Image 1" captured at a current time is 0.058 (e.g., from the example of FIG. 4A), assume the final measure for the red state for "Image 2" captured 50 milliseconds ago is 0.045 (e.g., within the first window of time, but generated based on distinct corresponding probabilities from the example of FIG. 4A), and assume the final measure for the red state for "Image N" captured 500 milliseconds ago is −0.005 (e.g., within the second window of time). In some implementations, the final measures for the red state can be summed as votes (e.g., 0.098) and compared to the summed final measures for the other candidate states (e.g., −0.540 for the green state). In this example, the red state can be selected based on the vote for the red state being the highest. In some additional and/or alternative implementations, and although not depicted, the final measures can be converted to binary values and the binary values can be used as votes in selecting the current state of the traffic light. The final measures can be converted to binary values if a given final measure exceeds some threshold (e.g., convert to "1" if positive, convert to "0" if negative). For instance, the final measure for the red state for "Image 1" can be converted to a value of "1", the final measure for the red state for "Image 2" can be converted to a value of "1", and the final measure for the red state for "Image N" can be converted to a value of "0", thereby resulting in two votes for the red state. Similarly, the final measure for the green state for "Image 1" can be converted to a value of "0", the final measure for the green state for "Image 2" can be converted to a value of "0", and the final measure for the green state for "Image N" can be converted to a value of "0", thereby resulting in zero votes for the green state. Thus, the red state would be selected as the current state of the traffic light.

Although tables 400A and 400B of FIG. 4A only depict learned coefficients for the red state and the green state, respectively, and not any of the other candidate states, it should be understood that tables 400A and 400B of FIG. 4A are provided for the sake of example and are not meant to be limiting. For example, each of the other candidate states (e.g., the yellow state, the off state, the not visible state, and/or other states of traffic lights) can also be associated with learned coefficients that are specific to a corresponding one of the candidate states and various windows of time. Moreover, although tables 400A and 400B of FIG. 4A are depicted as including the first window of time and the second window time, it should be understood that is also for the sake of example and is not meant to be limiting. For example the corresponding final measures can be generated using corresponding probabilities associated with images captured within the first window of time, or can be generated using prior corresponding probabilities associated with prior images captured within prior windows of time (e.g., a third window of time, a fourth window of time, and so on). Further, although table 400C of FIG. 4B is depicted as including final measures for only the red state and the green state, and is depicted as including only final measures for those states for only three images, it should be understood that is also for the sake of example and is not meant to be limiting.

However, it should be noted that prior corresponding probabilities associated with images that exceed a threshold age are not considered in generating the corresponding final measures since they are no longer indicative of the current state of the traffic light(s). The threshold age can be, for example, heuristically defined (e.g., four seconds, six seconds, ten seconds, and/or other threshold ages). For example, assume the threshold age is six seconds, if prior corresponding probabilities associated with a given image has an age of three seconds, then the prior corresponding probabilities associated with the given image may be considered in generating the corresponding final measures since the state of the traffic light three seconds ago may still be indicative of the current state of the traffic light(s). In contrast, if prior corresponding probabilities associated with a given image has an age of eight seconds, then the prior corresponding probabilities associated with the given image may not be considered in generating the corresponding final measures since the state of the traffic light eight seconds ago is less indicative of the current state of the traffic light(s). In this manner, the windows of time can be used to more accurately predict the current state of the traffic light(s) based on the corresponding final measures.

Figure 5:
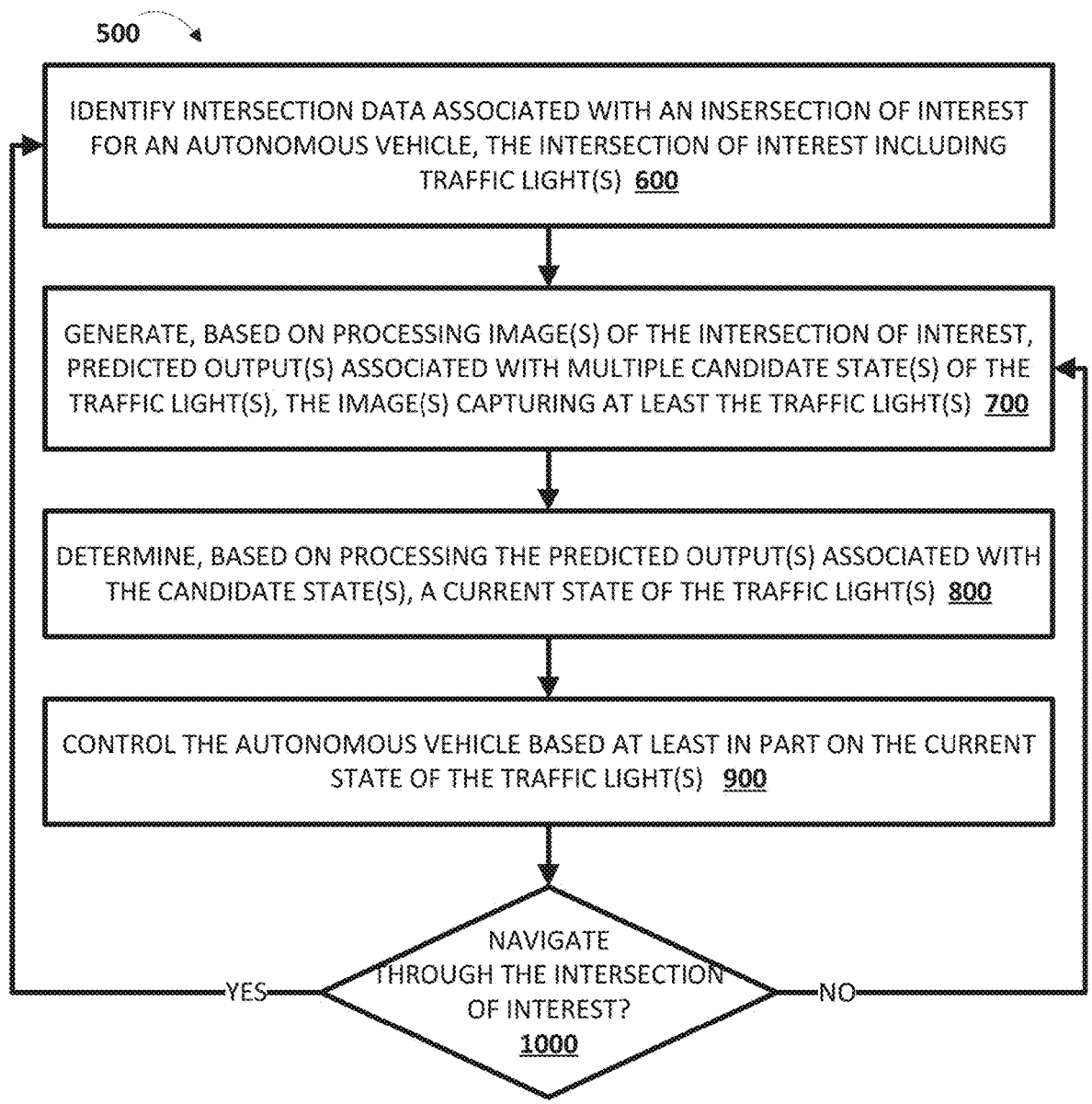
FIG. 5 is flowchart illustrating an example method of controlling an autonomous vehicle based on a current state of traffic light(s) of an intersection of interest for the autonomous vehicle, in accordance with various implementations.
Figure 6:
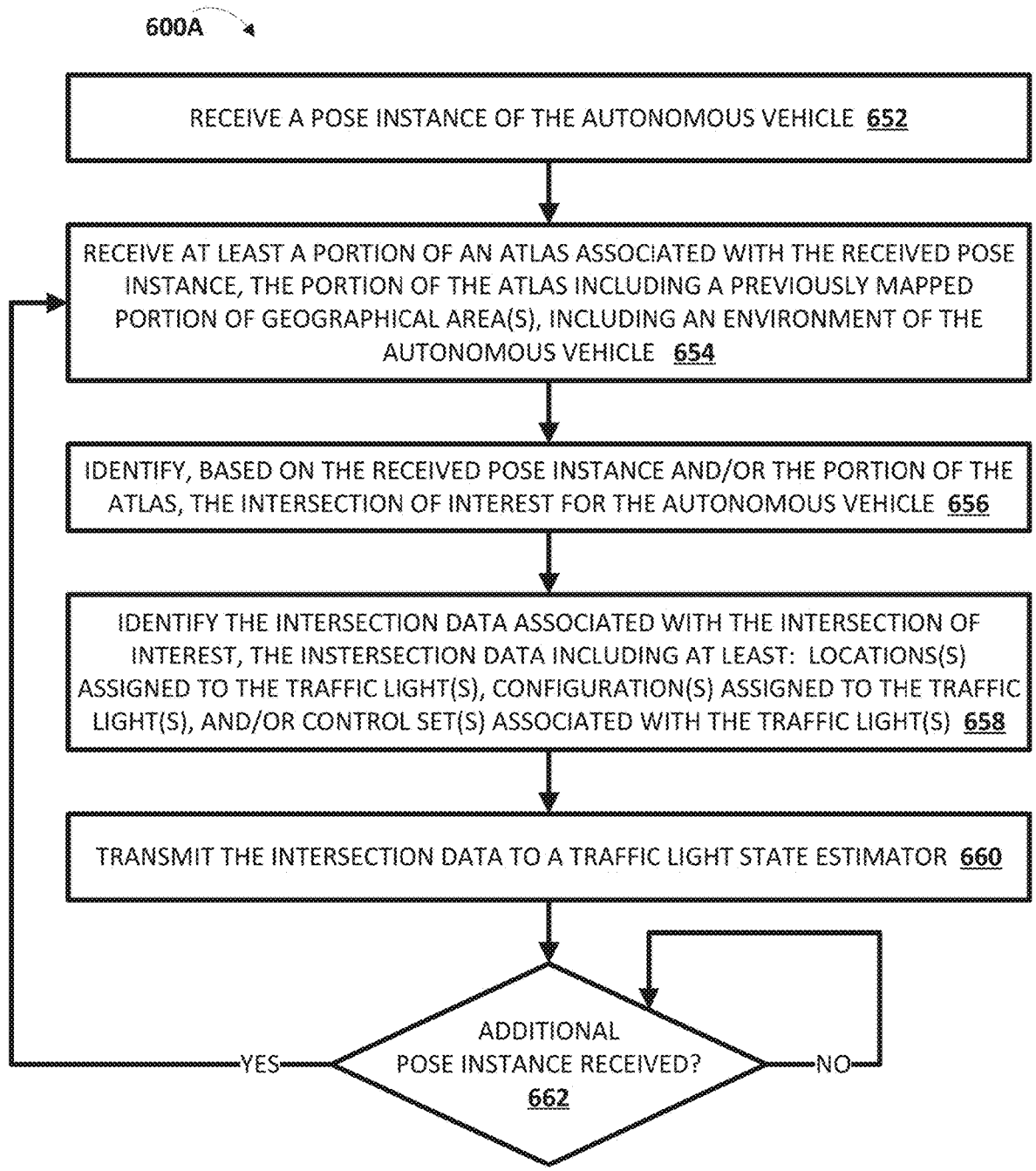
FIG. 6 is flowchart illustrating an example method of identifying intersection data associated with the intersection of interest for the autonomous vehicle of FIG. 5, in accordance with various implementations.
Figure 7:
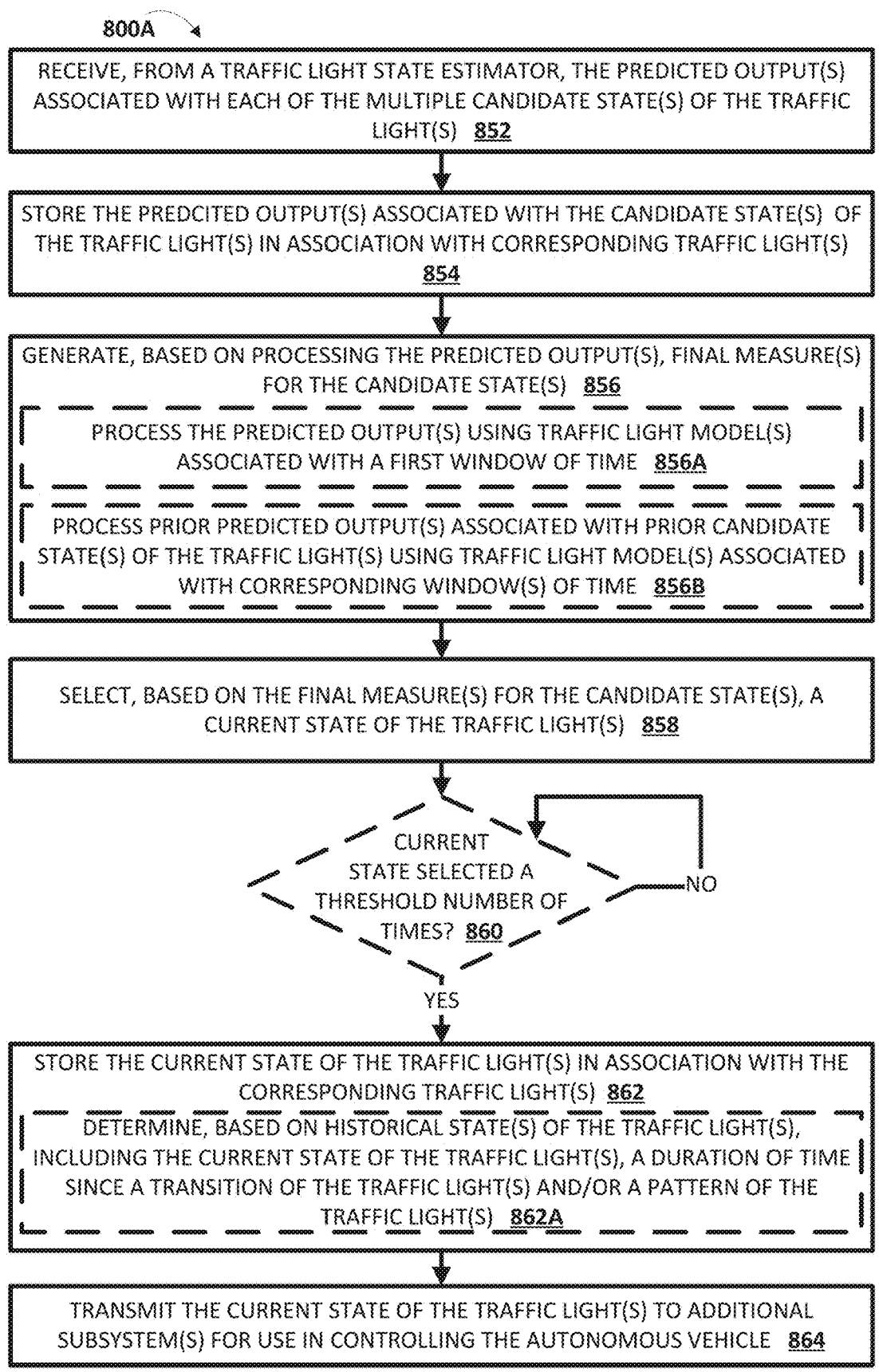
FIG. 7 is flowchart illustrating an example method of determining the current state of the traffic light(s) of the intersection of interest for the autonomous vehicle of FIG. 5, in accordance with various implementations.

Turning now to FIG. 5, an example method 500 of controlling an autonomous vehicle based on a current state of traffic light(s) of an intersection of interest for the autonomous vehicle is illustrated. The method 500 may be performed by an autonomous vehicle analyzing sensor data generated by sensor(s) of the autonomous vehicle (e.g., vehicle 100 of FIG. 1), by another vehicle (autonomous or otherwise), sensor data generated by another computer system that is separate from the autonomous vehicle, and/or some combination thereof. For the sake of simplicity, operations of the method 500 are described herein as being performed by a system (e.g., processor(s) 122 or primary vehicle control system 120, processor(s) of secondary vehicle control system 170, and/or a combination thereof). Moreover, some operations of method 500 of FIG. 5 are described herein with respect to method 600A of FIG. 6, and method 800A of FIG. 7. It will be appreciated that the operations of the methods of FIGS. 5-7 may be varied, and that some operations may be performed in parallel and/or iteratively in some implementations, so the methods illustrated in FIGS. 5-7 are merely provided for illustrative purposes.

At block 600 of FIG. 5, the system identifies intersection data associated with an intersection of interest for an autonomous vehicle, the intersection of interest including traffic light(s). The system can identify the intersection data using, for example, traffic light interface 154A of traffic light subsystem 154. As one non-limiting example, FIG. 6 depicts an example method 600A of how the system identifies the intersection data associated with the intersection of interest for the autonomous vehicle at block 600 of FIG. 5.

At block 652, the system receives a pose instance of an autonomous vehicle. The pose instance includes location and orientation information of the autonomous vehicle within its surrounding environment, and generally within some frame of reference (e.g., with respect to tile(s) of an atlas, with respect to the Earth, and/or other frames of reference).

At block 654, the system receives at least a portion of an atlas associated with the received pose instance, the portion of the atlas including a previously mapped portion of geographical area(s), including an environment of the autonomous vehicle. Further, the previously mapped portion of the environment can include intersection data for plurality of intersections. The system can determine, based on the received pose instance, a location of the autonomous vehicle, and can identify portion(s) of an atlas that encompasses the location of the autonomous vehicle and the surrounding environment. In some implementations, the portion of the atlas may be stored locally at the autonomous vehicle, and the portion of the atlas can be accessed locally at the autonomous vehicle (e.g., using RAS 162). In other implementations, the portion of the atlas may be stored remotely (e.g., at relative atlas service 182), and may be retrieved over network(s) (e.g., over network(s) 176 using RAS 162).

At block 656, the system identifies, based on the received pose instance and/or the portion of the atlas, an intersection of interest for the autonomous vehicle. The intersection of interest can be an intersection that includes one or more traffic lights and that the autonomous vehicle is currently navigating, or a next intersection that includes one or more traffic light and that the autonomous vehicle will navigate through in the near future. In some implementations, the system can compare location information of the received pose instance to the portion of the atlas to identify a location of the autonomous vehicle. In some additional and/or alternative implementations, the system can compare orientation information of the received pose instance to the portion of the atlas in the environment to identify a direction of travel of the autonomous vehicle. Thus, based on the location and/or the direction of travel of the autonomous vehicle, the system can identify an intersection that the autonomous vehicle is currently navigating or a next intersection that the autonomous vehicle will navigate through in the near future from the portion of the atlas.

At block 658, the system identifies intersection data associated with the intersection of interest, the intersection data including at least: location(s) (or pose(s)) assigned to the traffic light(s), configuration(s) assigned to the traffic light(s), and/or control set(s) associated with the traffic light(s). The intersection data can be stored in association with the intersection of interest in the atlas, and is discussed in greater detail herein (e.g., with respect to FIG. 2A).

At block 660, the system transmits the intersection data to a traffic light state estimator. The traffic light state estimator can be, for example, implemented by traffic light subsystem 154 of primary vehicle control system 120 along with a traffic light interface, secondary vehicle control system 170 distinct from the traffic light interface and/or remote system(s) in communication with the autonomous vehicle that are distinct from the traffic light interface.

At block 662, the system determines whether any additional pose instances are received. If, at an iteration of block 662, the system determines that no additional pose instance is received, then the system waits for an additional pose instance to be received at block 662. However, at an iteration of block 662, if the system determines that an additional pose instance has been received, then the system returns to block 654. In some implementations, at subsequent iterations of the method 600A, the system may determine the intersection of interest identified at subsequent iterations of block 656 is the same intersection that was initially identified at block 656. In some versions of those implementations, the system may refrain from transmitting the intersection data in these subsequent iterations. By refraining from transmitting the intersection data at these subsequent iterations, the system can verify the initially identified intersection of interest at block 656 is the correct intersection while also reducing consumption of computational and/or network resources.

Referring back to FIG. 5, at block 700, the system generates, based on processing image(s) of the intersection of interest, predicted output(s) associated with candidate state(s) of the traffic light(s), the image(s) capturing region(s) that are predicted to include the traffic light(s). The system can generate the predicted output(s) using machine learning classifier(s) as discussed in greater detail herein (e.g., with respect to FIGS. 2A, 2B, and 3).

At block 800, the system determines, based on processing the predicted output(s) associated with the candidate state(s), a current state of the traffic light(s). More particularly, the system determines the current state of the traffic light(s) using traffic light interface 154A of traffic light subsystem 154. As one non-limiting example, FIG. 7 shows an example method 800A of how the system determines the current state of the traffic light(s) at block 800 of FIG. 5.

At block 852, the system receives, from a traffic light state estimator, predicted output(s) associated with the candidate state(s) of traffic light(s) of the intersection of interest for the autonomous vehicle. The traffic light state estimator can be, for example, implemented by traffic light subsystem 154 of primary vehicle control system 120 along with a traffic light interface, secondary vehicle control system 170 distinct from the traffic light interface and/or remote system(s) in communication with the autonomous vehicle that are distinct from the traffic light interface.

At block 854, the system stores the predicted output(s) associated with the candidate state(s) of the traffic light(s) in association with corresponding traffic light(s). The predicted output(s) associated with the candidate state(s) can also be stored in association with a timestamp corresponding to a time a given image, for which the predicted output(s) are generated, was captured. In some implementations, the system can purge predicted output(s) from storage after a threshold duration of time (e.g., two seconds, three seconds, five seconds, and/or other durations of time). For example, the system may purge predicted output(s) from storage that are associated with image(s) captured three or more seconds ago since those predicted output(s) may no longer be helpful in determining the current state of the traffic light due to the nature of traffic lights frequently transitioning between states.

At block 856, the system generates, based on processing the predicted output(s), final measure(s) for the candidate state(s). The final measure(s) for the candidate state(s) can be generated as a function of the predicted output(s) associated with the candidate state(s). In some implementations, generating the final measure(s) is further based on an effective distance from a vision component that captured the image(s) for which the predicted output(s) are generated. For example, assume a first vision component captures a 256× 256 image of the intersection, and a given traffic light is included in an 8×4 region of the image (i.e., the traffic light is included in 32 pixels of the image). In this example, the effective distance can be determined as a function of the 8×4 region of the image that includes the traffic light.

In some implementations, the method 800A may further include optional sub-blocks 856A. At optional sub-block 856A, the system may process the predicted output(s) using traffic light (TL) model(s) (e.g., as discussed in greater detail herein with respect to TL model(s) 254AN of FIGS. 2A, 2B, 3, and 4), for each of the candidate states, associated with a first window of time. The TL model(s), for each of the candidate states, associated with the first window of time can include functions having a learned coefficient corresponding to each of the candidate state(s), and the system can generate the final measure(s) for the candidate state(s) by modifying the predicted output(s) based on one or more of the learned coefficients of the learned function. The first window of time can include corresponding predicted output(s) that are generated based on most recently captured images (e.g., prior predicted output(s) corresponding to images captured in the last 125 milliseconds). Notably, the first window of time can include multiple instances of predicted output from multiple images of the traffic light(s). Further, the system may process further predicted output(s) from other windows of time. For example, in some additional and/or alternative implementations, the method 800A may further include optional sub-block 856B. At optional sub-block 856B, the system may also process prior predicted output(s) associated with the candidate state(s) of the traffic light(s) using TL model(s), for each of the candidate states, associated with corresponding window(s) of time (e.g., as discussed in greater detail herein with respect to TL model(s) of FIGS. 2A, 2B, 3, and 4).

At block 858, the system selects, based on the final measure(s) for the candidate state(s), a current state of the traffic light(s). For example, if the final measure(s) are based on corresponding values for each of the candidate states, then the system can select a given state as the current state, from among the candidate states, based on the corresponding values indicating that the given state is the current state (e.g., the highest corresponding value and/or other selection criteria).

In some implementations, the method 800A may further include optional block 860. At optional block 860, the system may determine whether the current state is selected a threshold number of times in a threshold number of prior selections. If, at an iteration of optional block 860, the system determines the current state is not selected a threshold number of times in a threshold number of prior selections, then the system may wait at block 860 until the current state is selected the threshold number of times in the threshold number of prior selections. However, at an iteration of optional block 860, if the system determines the current state is selected a threshold number of times in a threshold number of prior selections, then the system may proceed to block 862. For example, assume the threshold number of times is seven and the threshold number of prior selections is ten. If the current state is selected at least seven times in the prior ten iterations of the method 800A, then the system verifies the current state selected is an actual state of the traffic light. In this manner, the system may verify the current state of the traffic light(s) prior to using the selected current state in controlling the autonomous vehicle. By verifying the current state of the traffic light(s), the system can prevent states false negatives and/or false positives from being used to control the autonomous vehicle. In implementations that do not include optional block 860, the system may proceed directly from block 858 to block 862.

At block 862, the system stores the current state of the traffic light(s) in association with the corresponding traffic light(s). The current state of the traffic light(s) can also be stored in association with a timestamp corresponding to a time a given image, for which the current state is generated, was captured. In some implementations, the system can purge current state(s) from storage after a threshold duration of time (e.g., fifteen seconds, twenty seconds, forty seconds, and/or other durations of time). For example, the system may purge current states from storage that are associated with image(s) captured thirty or more seconds ago since those current states may no longer be the current state or helpful in determining state transitions of the traffic light(s).

In some implementations, the method 800A may further include optional sub-block 862A. At optional block 862A, the system may determine, based on historical state(s) of the traffic light(s), including the current state of the traffic light(s), a duration of time since a transition of the traffic light(s) and/or a pattern of the traffic light(s). In some versions of those implementations, the system can determine a transition in a state of the traffic light(s) has occurred. In some versions of those implementations, the system can also identify various pattern(s) of the traffic light(s), such as a flashing pattern. The transition(s) and pattern(s) of the traffic light(s) are discussed in greater detail herein (e.g., with respect to FIG. 3).

At block 864, the system transmits the current state of the traffic light(s) to additional subsystem(s) for use in controlling the autonomous vehicle. The current state of the traffic light(s) may correspond to a state of one or more control sets associated with the traffic light(s). For example, if a given traffic light includes five bulbs that control whether the autonomous vehicle can take a pass through action and a right turn action, a main control set associated with the pass through action may indicate that the given traffic light is in red state for the main control set, thereby preventing the autonomous vehicle from taking the pass through action. However, a right control set associated with the right turn action may indicate that the given traffic light is in green state for the right control set, thereby allowing the autonomous vehicle to take the right turn action even though the autonomous vehicle cannot take the pass through action. Further, the system may transmit the current state of the traffic light(s) to, for example, perception subsystem 156, planning subsystem 158, and/or control subsystem 160 of primary vehicle control system 120. These subsystems 156-160 can utilize the current state of the traffic light(s) to control the autonomous vehicle.

Referring back to FIG. 5, at block 900, the system controls the autonomous vehicle based at least in part on the current state of the traffic light(s). For example, for the intersection of interest, the system may transmit the current state of the traffic light(s) of the intersection of interest to a planning subsystem for use in planning a route through the intersection if not previously determined. As another example, the system may transmit the current state of the traffic light(s) of the intersection of interest to a control subsystem for use in controlling a drivetrain of the autonomous vehicle to take a desired action. In some implementations, the system can transmit the current state of the traffic light(s) to other autonomous vehicles in the environment of the autonomous vehicle and/or remote system(s). In some versions of those implementations, the other autonomous vehicles in the environment of the autonomous vehicle may utilize the current state of the traffic light(s) in controlling the other autonomous vehicles. For example, assume a first autonomous vehicle is at an entry point of the intersection and can process image(s) of a given traffic light to determine a current state of the given traffic light indicates a main control set is in a red state, and further assume a second autonomous vehicle is further away from the entry point of the intersection such that the given traffic light is occluded from view of vision component(s) of the second autonomous vehicle. In this example, the first autonomous vehicle can transmit the red state associated with the main control set of the intersection to the second autonomous vehicle. The second autonomous vehicle may then use the red state associated with the main control set in various subsystems.

At block 1000, the system determines whether the autonomous vehicle has navigated through the intersection of interest. If, at an iteration of block 1000, the system determines that the autonomous vehicle has not navigated through the intersection of interest, then the system may return to block 700 and continue with the method 500. In this manner, the system can continue processing a stream of images of the intersection of interest to generate further predicted output(s) associated with the candidate state(s) of the traffic light(s), determining the current state of the traffic light(s) based on the further predicted output(s), and controlling the autonomous vehicle based at least in part on the current state of the traffic light(s) until the autonomous vehicle successfully navigates through the intersection of interest. However, at an iteration of block 1000, if the system determines that the autonomous vehicle has navigated through the intersection of intersection, then the system may return to block 600 to identify further intersection data associated with a next intersection of interest for the autonomous vehicle.

It should be understood that the operations of FIGS. 5-7 described herein may be utilized to determine a current state of a plurality of traffic lights and their associated control sets sequentially and/or in parallel. Further, it should be understood that multiple iterations of the operations of FIGS. 5-7 may be performed in parallel for the sake of redundancy. As noted above, it should also be understood that the operations of FIGS. 5-7 can be performed by a remote computing system (e.g., server-based and/or cloud-based implementations). For example, the sensor data and the image(s) generated by the autonomous vehicle can be transmitted to the remote computing system over one or more networks, and the remote computing system can process the sensor data and transmit information back to the autonomous vehicle over one or more of the networks. The information can include, for example, the pose instances, the intersection data, the predicted output(s) associated with each of the multiple candidate states, the current state of the traffic light(s), control commands for the autonomous vehicle, and/or any other information described herein. For instance, the autonomous vehicle can transmit the image(s) to the remote computing system, the remote computing system can process the image(s) along with the intersection data to select the current state of one or more traffic lights captured in the image(s), and the autonomous vehicle can determine one or more actions that can be taken based on the selected current state of one or more of the traffic lights. As another example, the remote computing system can send one or more control commands to the autonomous vehicle based on the selected current state of one or more of the traffic lights.

Other variations will be apparent to those of ordinary skill. Therefore, the invention lies in the claims hereinafter appended.

What is claimed is:

1. A method implemented by one or more processors of an autonomous vehicle, the method comprising:
processing an image using a machine learning classifier, wherein the image is captured by a vision component of the autonomous vehicle, and wherein the image is processed using the machine learning classifier based on the image capturing a region that is predicted to include a traffic light;
generating, based on processing the image using the machine learning classifier, a corresponding numerical measure for each of multiple candidate states of the traffic light;
generating, based on processing each of the corresponding numerical measures, a corresponding final measure for each of the candidate states;
processing an additional image using the machine learning classifier, wherein the additional image is captured by an additional vision component of the autonomous vehicle, wherein the additional image is processed using the machine learning classifier based on the additional image capturing the region that is predicted to include the traffic light, wherein the additional image is in addition to the image, wherein the additional image is captured at or near the same time as the image, and wherein the additional vision component is in addition to the vision component;
generating, based on processing the additional image using the machine learning classifier, an additional corresponding numerical measure for each of multiple candidate states of the traffic light;
generating, based on processing each of the additional corresponding numerical measures, an additional corresponding final measure for each of the candidate states;
selecting one of the candidate states as a current state of the traffic light, wherein the selecting is based on the corresponding final measures for the candidate states and based on the additional corresponding final measures for the candidate states; and
controlling the autonomous vehicle based on the selected current state of the traffic light.

2. The method of claim 1,
wherein generating the corresponding final measure for each of the candidate states comprises generating the corresponding final measure as a function of:
the corresponding numerical measure for a given candidate state of the candidate states, and
the corresponding numerical measures for the other candidate states; and
wherein generating the corresponding final measure as a function of the corresponding numerical measure for the given candidate state, and the corresponding numerical measures for the other candidate states comprises:
generating a corresponding candidate state value based on modifying the corresponding numerical measure, for the given candidate state, based on a coefficient that is specific to the given candidate state;
generating corresponding other candidate state values based on modifying each of the corresponding numerical measures, for each of the other candidate states, based on corresponding other coefficients, for each of the other candidate states, that are also specific to the given candidate state; and
generating the corresponding final measure as a function of the corresponding candidate state value and the corresponding other candidate state values.

3. The method of claim 2, wherein the coefficient that is specific to the given candidate state and the other coefficients that are specific to the corresponding one of the other candidate states are learned coefficients.

4. The method of claim 3, wherein the learned coefficients are generated based on performing an optimization process based on labeled training instances.

5. The method of claim 3, wherein generating the corresponding final measure for each of the candidate states further comprises:
retrieving, from one or more databases, a prior corresponding numerical measure for each of the multiple candidate states of the traffic light, the prior corresponding numerical measure for each of the multiple candidate states of the traffic light being previously generated based on processing one or more prior images using the machine learning classifier, the one or more prior images capturing the region that is predicted to include the traffic light; and
wherein generating the corresponding final measure is further a function of:
the prior corresponding numerical measure for the given candidate state of the candidate states, and
the prior corresponding numerical measures for the other candidate states.

6. The method of claim 5, wherein generating the corresponding final measure further as a function of the prior corresponding numerical measure for the given candidate state, and the prior corresponding numerical measures for the other candidate states comprises:
generating a prior corresponding candidate state value based on modifying the prior corresponding numerical measure, for the given candidate state, based on an additional coefficient that is specific to the given candidate state;
generating prior corresponding other candidate state values based on modifying each of the prior corresponding numerical measures, for each of the other candidate states, based on corresponding additional other coefficients, for each of the other candidate states, that are also specific to the given candidate state; and
generating the corresponding final measure further as a function of the prior corresponding candidate state value and the prior corresponding other candidate state values.

7. The method of claim 6, wherein the corresponding numerical measure for each of the multiple candidate states of the traffic light is associated with a first window of time, and wherein the prior corresponding numerical measure for each of the multiple candidate states of the traffic light is associated with a second window of time.

8. The method of claim 7, wherein the learned coefficients that are specific to the corresponding numerical measure for each of the multiple candidate states of the traffic light are associated with the first window of time, and wherein the additional coefficients that are specific to the prior corresponding numerical measure for each of the multiple candidate states of the traffic light are associated with the second window of time.

9. The method of claim 2, wherein the corresponding final measure is further generated as a function of an effective distance to the traffic light included in the image captured by the vision component, and wherein the effective distance is determined as a function of a number of pixels in the image that include at least a portion of the traffic light.

10. The method of claim 1, further comprising:
comparing the selected current state of the traffic light to one or more historical states of the traffic light;
identifying, based on the comparing, a transition of the traffic light from a first state associated with one or more of the historical states to a second state associated with the current state; and
wherein controlling the autonomous vehicle is further based on the identified transition of the traffic light.

11. The method of claim 1,
wherein generating the additional corresponding final measure for each of the candidate states comprises generating the additional corresponding final measure as a function of:
the additional corresponding numerical measure for the given candidate state of the candidate states, and
the additional corresponding numerical measures for the other candidate states.

12. The method of claim 1, wherein the candidate states of the traffic light comprise one or more of a first state indicative of a red state of the traffic light, a second state indicative of a yellow state of the traffic light, a third state indicative of a green state of the traffic light, a fourth state indicative of an off state of the traffic light, or a fifth state indicative of a not visible state of the traffic light.

13. The method of claim 1, wherein the selected current state of the traffic light is associated with one or more control sets, and wherein each of the one or more control sets are associated with a bulb pattern of the traffic light that influences when a first action can be performed by the autonomous vehicle at the traffic light.

14. The method of claim 13, wherein the traffic light is one of a plurality of traffic lights of an intersection, and wherein controlling the autonomous vehicle based on the selected current state of the traffic light comprises controlling the autonomous vehicle based on the one or more control sets associated with the traffic light and one or more additional control sets associated with at least an additional traffic light, of the plurality of traffic lights, that is in addition to the traffic light.

15. The method of claim 14, wherein the one or more control sets associated with the traffic light influence when a first action can be performed by the autonomous vehicle, wherein the one or more additional control sets associated with at least the additional traffic light influence when a second action can be performed by the autonomous vehicle, and wherein the first action is distinct from the second action.

16. The method of claim 14,
wherein generating the additional corresponding final measure for each of the candidate states of the additional traffic light comprises:
generating the additional corresponding final measure as a function of:
the additional corresponding numerical measure for the given candidate state of the candidate states of the additional traffic light, and
the additional corresponding numerical measures for the other candidate states of the additional traffic light; and
the method further comprising:
selecting one of the candidate states of the additional traffic light as a current state of the additional traffic light, wherein the selecting is based on the additional corresponding final measures for the candidate states of the additional traffic light, and
wherein the one or more additional control sets associated with at least the additional traffic light are based on the selected current state of the additional traffic light.

17. The method of claim 16, wherein the image and the additional image are cropped images from an original image of the intersection that includes plurality of traffic lights, and that is captured by the vision component of the autonomous vehicle.

18. A method implemented by one or more processors of an autonomous vehicle, the method comprising:
receiving predicted output, wherein the predicted output is generated based on processing an image using a machine learning classifier, wherein the image is captured by a vision component of the autonomous vehicle, and wherein the image captures a region that is predicted to include the traffic light;
identifying, based on the received predicted output, a corresponding numerical measure for each of multiple candidate states of a traffic light;
generating, based on processing each of the corresponding numerical measure, a corresponding final measure for each of the candidate states, wherein generating the corresponding final measure for each of the candidate states comprises:
generating a corresponding candidate state value based on modifying a corresponding numerical measure, for a given candidate state, based on a coefficient that is specific to the given candidate state;
generating corresponding other candidate state values based on modifying corresponding numerical measures, for each of the other candidate states, based on corresponding other coefficients, for each of the other candidate states, that are also specific to the given candidate state; and
generating the corresponding final measure as a function of the corresponding candidate state value and the corresponding other candidate state values;
selecting one of the candidate states as a current state of the traffic light, wherein the selecting is based on the corresponding final measures; and
controlling the autonomous vehicle based on the selected current state of the traffic light.

19. A traffic light system of an autonomous vehicle, the traffic light system comprising:
at least one processor; and
at least one memory comprising instructions that, when executed, cause the at least one processor to:
process an image using a machine learning classifier, wherein the image is captured by a vision component of the autonomous vehicle, and wherein the image is processed using the machine learning classifier based on the image capturing a region that is predicted to include a traffic light;
generate, based on processing the image, a corresponding numerical measure for each of multiple candidate states of the traffic light;

generate, based on processing each of the corresponding numerical measures, a corresponding final measure for each of the candidate states;

select one of the candidate states as a current state of the traffic light, wherein the selecting is based on the corresponding final measures;

compare the selected current state of the traffic light to one or more historical states of the traffic light, wherein one or more of the historical states of the traffic light are associated with a threshold age relative to the image being captured, and wherein the threshold age is ten seconds or less relative to the image being captured;

identify, based on the comparing, a transition of the traffic light from a first state associated with one or more of the historical states to a second state associated with the current state; and control the autonomous vehicle based on the selected current state of the traffic light and the identified transition of the traffic light.

* * * * *